(12) United States Patent
Hatano et al.

(10) Patent No.: US 6,707,026 B2
(45) Date of Patent: Mar. 16, 2004

(54) SOLID IMMERSION MIRROR AND REPRODUCING APPARATUS

(75) Inventors: Hiroshi Hatano, Azuchi-machi (JP); Tomoko Miyaura, Azuchi-machi (JP); Tadafumi Sakata, Azuchi-machi (JP)

(73) Assignee: Minolta Co., Ltd., Osaka (JP)

( * ) Notice: Subject to any disclaimer, the term of this patent is extended or adjusted under 35 U.S.C. 154(b) by 137 days.

(21) Appl. No.: 09/917,637

(22) Filed: Jul. 31, 2001

(65) Prior Publication Data

US 2002/0014575 A1 Feb. 7, 2002

(30) Foreign Application Priority Data

Aug. 4, 2000 (JP) ..................................... 2000-236724
Aug. 7, 2000 (JP) ..................................... 2000-238315
Aug. 17, 2000 (JP) ..................................... 2000-247439

(51) Int. Cl.$^7$ ................................................. H01J 3/14
(52) U.S. Cl. ..................... 250/216; 250/201.5; 359/656; 369/112.01
(58) Field of Search ........................ 250/201.1–201.5, 250/216, 201.9, 203.1, 203.2; 359/729–732, 656, 661, 362

(56) References Cited

U.S. PATENT DOCUMENTS 5,638,219 A * 6/1997 Medina Puerta et al. ... 359/729
6,185,051 B1 * 2/2001 Chen et al. .................. 359/709
6,236,514 B1 * 5/2001 Sato ............................ 359/664
6,266,315 B1 * 7/2001 Lee et al. ................ 369/112.01
6,275,453 B1    8/2001 Ueyanagi et al.
6,359,850 B1    3/2002 Chung et al.
6,493,156 B1 * 12/2002 Oh et al. ..................... 359/742
6,528,780 B1 * 3/2003 Mitsuoka et al. ........... 250/216
6,552,852 B2 * 4/2003 Hill ............................. 359/618

FOREIGN PATENT DOCUMENTS

WO   WO 99/27532   *  6/1999   .......... G11B/7/135

* cited by examiner

*Primary Examiner*—David Porta
*Assistant Examiner*—Patrick J. Lee
(74) *Attorney, Agent, or Firm*—Morrison & Foerster LLP

(57) ABSTRACT

An SIM (solid immersion mirror) made principally of a light-permeable high-refractive-index medium has a lower surface which is produced by rotating a parabola about a symmetry axis, and an upper surface which is a perpendicular bisector surface of a line segment connecting the vertex and the focus of the parabola. The upper surface has the property of transmitting collimated light incident in a direction perpendicular thereto and reflecting the light reflected from the lower surface. Such a structure of the SIM facilitates the design of the upper surface and the lower surface both of which are reflecting surfaces, and allows the light to be incident on a light focusing point uniformly from therearound, thereby to form a proper light spot at the light focusing point. Additionally, the SIM allows the light to enter the medium through the entire upper surface, to achieve effective use of light.

54 Claims, 29 Drawing Sheets

F I G. 1 1
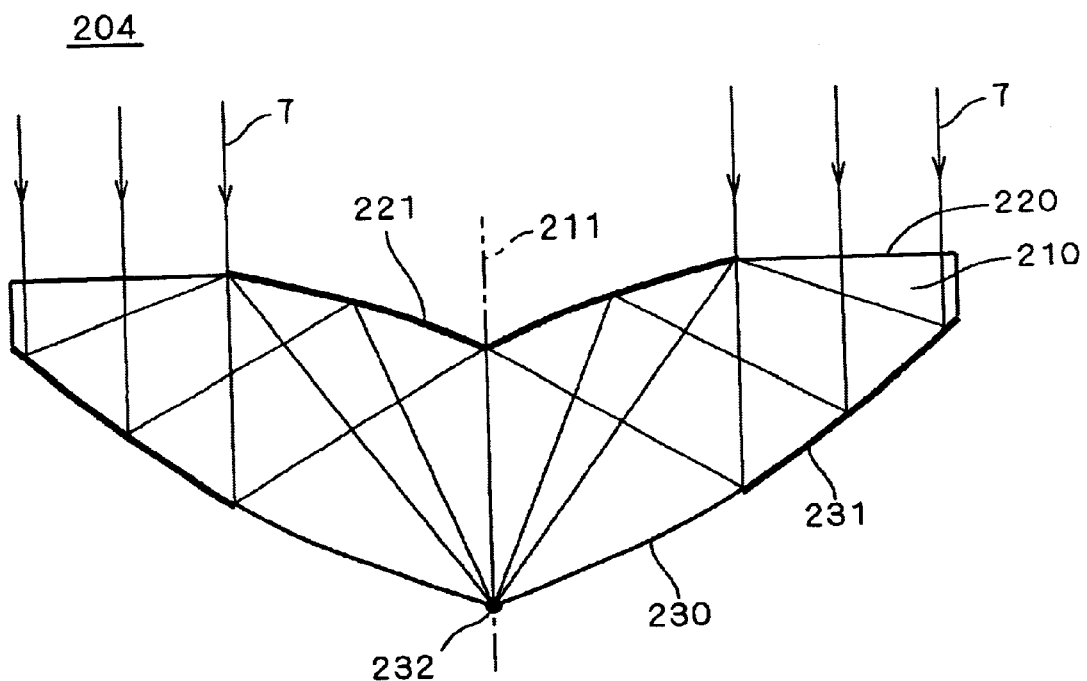
F I G. 1 2
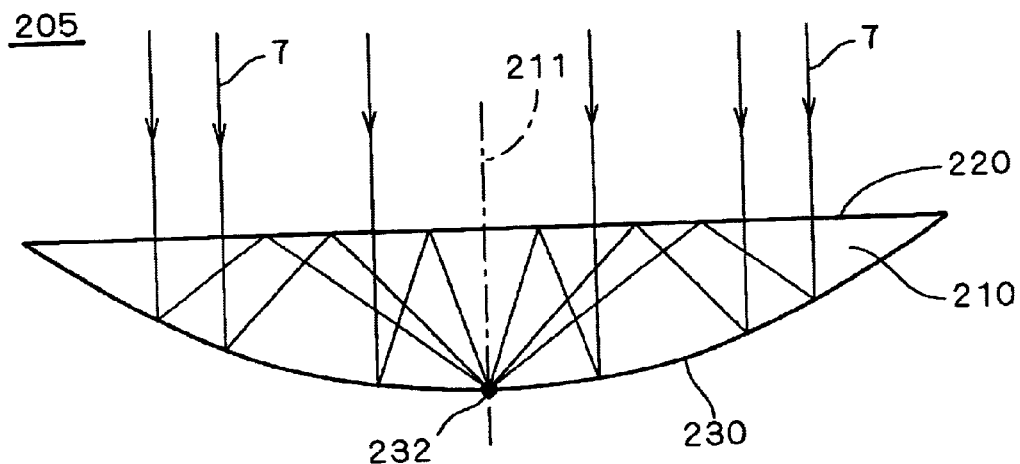

F I G. 40
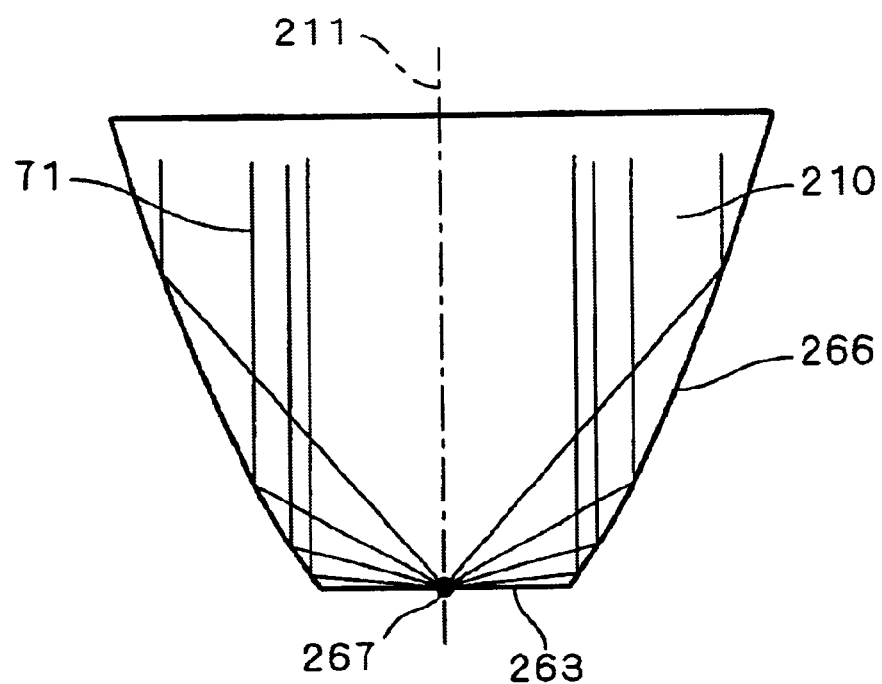

F I G. 44
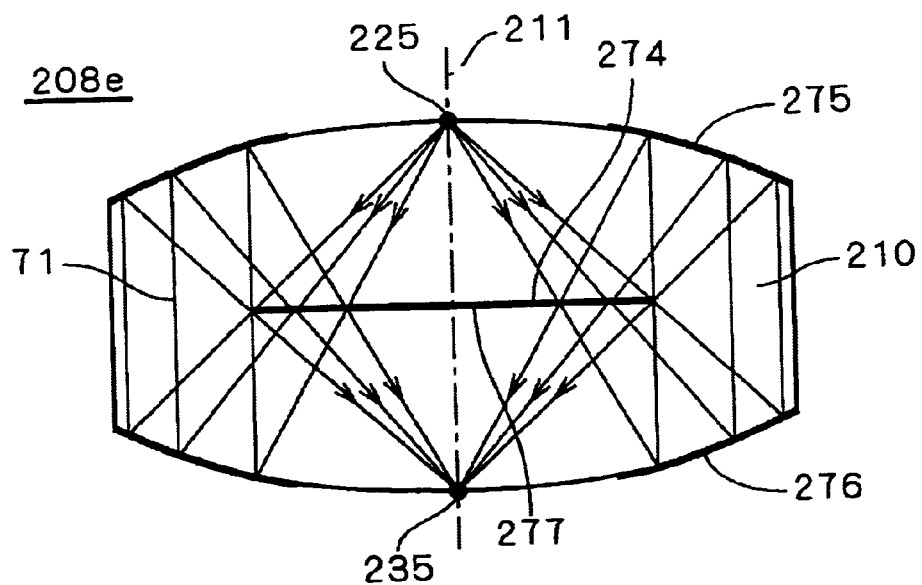
F I G. 45
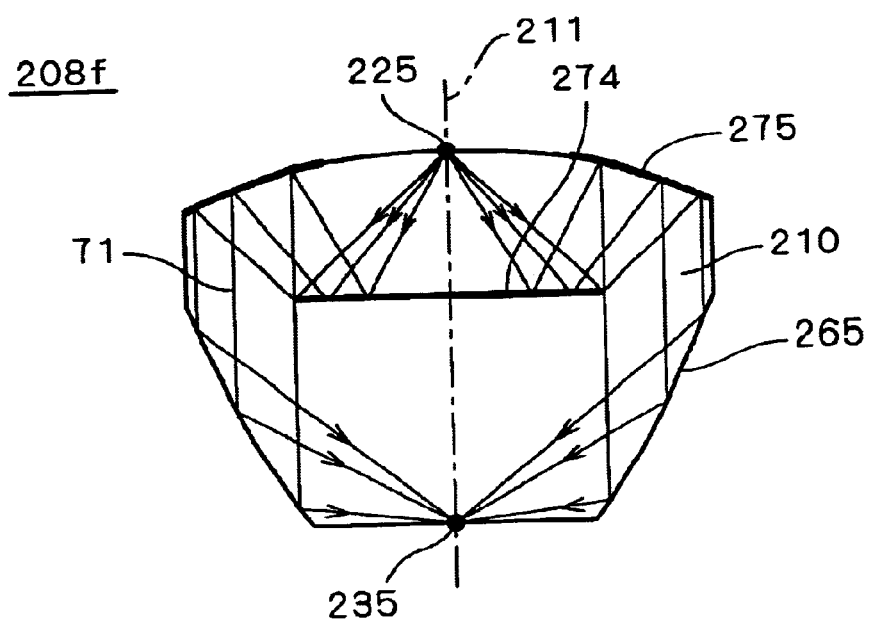

SOLID IMMERSION MIRROR AND REPRODUCING APPARATUS

This application is based on applications Nos. 2000-236724, 2000-238315 and 2000-247439 filed in Japan, the contents of which are hereby incorporated by reference.

BACKGROUND OF THE INVENTION

1. Field of the Invention

The present invention relates to a solid immersion mirror for use in a microscope which uses light to observe samples, a recording/reproducing apparatus which uses light to record, reproduce and erase information, and the like.

2. Description of the Background Art

An optical microscope which employs a solid immersion lens (abbreviated hereinafter as an "SIL") is conventionally known. The SIL is made of a high refractive medium, and light entering the SIL is focused to a predetermined light focusing point on an SIL surface. The use of the SIL achieves the increase in numerical aperture in accordance with the refractive index of the medium. Therefore, bringing an object to be observed into proximity to a near-field region of the light focusing point of the SIL provides a smaller light-focused spot diameter.

It has also been proposed to utilize such characteristics of the SIL to form a minute light spot, thereby achieving recording and reproduction using light. More specifically, a technique has been proposed which utilizes near-field light (not only limited to evanescent light but also including light existing in the near-field region of the light focusing point) near the light focusing point by bringing the light focusing point of the SIL and a recording medium in close proximity to each other, thereby to record and reproduce information on a minute region of the recording medium.

On the other hand, a solid immersion mirror (abbreviated hereinafter as an "SIM") has also been proposed which produces functions similar to those of the SIL by the use of light reflection in a high refractive medium. The SIM which uses light reflection has the advantage of not causing a light-focusing deviation (i.e., chromatic aberration) resulting from wavelengths when light is focused.

Conventional examples of the SIM are disclosed in, for example, Japanese Patent Application Laid-Open No. 11-305132 (1999) and Japanese Patent Application Laid-Open No. 11-238238 (1999). The SIM disclosed in Japanese Patent Application Laid-Open No. 11-305132 has a light source directly mounted to the SIM, and focuses a divergent light beam from the light source. The SIM disclosed in Japanese Patent Application Laid-Open No. 11-238238 focuses collimated light incident sideways on the SIM.

However, when directly mounting the light source to the SIM, it is difficult to adjust the positional relationship between the SIM and the light source, and therefore a high mounting accuracy is required. Further, when the SIM is mounted to a so-called floating slider similar to that of a hard disc for recording and reproduction, there arises another problem in increased weight of the floating slider.

The SIM disclosed in Japanese Patent Application Laid-Open No. 11-305132 has a lower surface which is flat and reflects light therefrom. Since the SIM is used in close proximity to an object, the SIM having the lower surface which is flat and serves as a reflecting surface has a high possibility that the lower surface contacts the object, and is in danger of damages to the reflecting surface.

As in the SIM disclosed in Japanese Patent Application Laid-Open No. 11-238238, on the other hand, the collimated light incident sideways on the SIM cannot impinge on the light focusing point uniformly (i.e., at uniform intensity from various directions) to result in an expanded or elliptical spot formed at the light focusing point. Uniform impingement of the light on the light focusing point requires previous control of an intensity distribution of the incident collimated light. It is, however, practically difficult to provide such an optical means.

SUMMARY OF THE INVENTION

The present invention is intended for a solid immersion mirror device made principally of a light-permeable medium having a refractive index of greater than 1. According to a first aspect of the present invention, the solid immersion mirror device comprises: a first reflecting surface which is part of a curved surface produced by rotating a parabola about a symmetry axis thereof; and a second reflecting surface which is part of a plane perpendicular to a line segment connecting the focus of the parabola and the vertex of the parabola, wherein collimated light entering the medium from the second reflecting surface side along the symmetry axis is reflected sequentially from the first and second reflecting surfaces while propagating in the medium, and is then focused to a light focusing point on a boundary of the medium.

The first reflecting surface is part of the curved surface produced by rotating the parabola. This facilitates the design of the shapes of the first and second reflecting surfaces, and achieves the formation of a proper light spot at the light focusing point.

According to a second aspect of the present invention, the solid immersion mirror device comprises: a first reflecting surface which is part of a curved surface produced by rotating part of a parabola lying on the opposite side of a rotational axis from the vertex of the parabola about the rotational axis, the rotational axis being parallel to the symmetry axis of the parabola and intersecting the parabola at a position spaced apart from the vertex of the parabola; and a second reflecting surface which part of a conical surface produced by rotating part of a line lying on the opposite side of the rotational axis from the vertex, the line being perpendicular to a line segment connecting the focus of the parabola and a point of intersection of the parabola and the rotational axis within a plane including the parabola, wherein collimated light entering the medium from the second reflecting surface side along the rotational axis is reflected sequentially from the first and second reflecting surfaces while propagating in the medium, and is then focused to a light focusing point on a boundary of the medium.

The first reflecting surface is part of the curved surface produced by rotating the parabola. This also facilitates the design of the shapes of the first and second reflecting surfaces, and achieves the formation of a proper light spot at the light focusing point.

According to a third aspect of the present invention, the solid immersion mirror device comprises: a first reflecting surface of a substantially annular shape and provided in a lower portion of the medium; and second reflecting surface provided in an upper portion of the medium, wherein light entering the medium in a predetermined direction from the upper portion to the lower portion is reflected sequentially from the first and second reflecting surfaces while propagating in the medium, and is then focused to a light focusing point on a boundary of the medium, and wherein part of light reflected from the first reflecting surface is reflected from near a point of intersection of the second reflecting surface and a line passing through the light focusing point and parallel to the predetermined direction.

This enables light with a small incident angle to be incident on the light focusing point, thereby forming a proper light spot at the light focusing point.

According to a fourth aspect of the present invention, the solid immersion mirror device comprises: a first reflecting surface provided in a lower portion of the medium; and a second reflecting surface provided in an upper portion of the medium, wherein at least part of light entering the medium in a predetermined direction from the upper portion to the lower portion passes through the second reflecting surface, is thereafter reflected sequentially from the first and second reflecting surfaces while propagating in the medium, and is then focused to a light focusing point on a boundary of the medium.

This enables light to pass through the second reflecting surface to enter the medium, thereby utilizing the light efficiently.

According to a fifth aspect of the present invention, the solid immersion mirror device comprises: an upper surface formed in an upper portion of the medium; and a side reflecting surface of a substantially tubular shape extending from the upper portion to a lower portion of the medium, wherein light entering the medium by way of the upper surface in a direction from the upper portion to the lower portion is reflected once from the side reflecting surface while propagating in the medium, and is then focused to a light focusing point on a boundary of the lower portion.

This prevents damages to the reflecting surface of the solid immersion mirror device.

According to a sixth aspect of the present invention, the solid immersion mirror device comprises: a light incident point positioned on a boundary of an upper portion of the medium; and a side reflecting surface of a substantially tubular shape extending from the upper portion to a lower portion of the medium, wherein divergent light entering the medium from the light incident point is reflected once from the side reflecting surface while propagating in the medium, and is then focused to a light focusing point on a boundary of the lower portion.

This also prevents damages to the reflecting surface of the solid immersion mirror device.

According to a seventh aspect of the present invention, the solid immersion mirror device comprises: a light incident point positioned on a boundary of an upper portion of the medium; a first reflecting surface positioned in a lower portion of the medium and having a downwardly protruding convex shape; and a second reflecting surface positioned in the upper portion, wherein divergent light entering the medium from the light incident point is reflected sequentially from the first and second reflecting surfaces while propagating in the medium, and is then focused to a light focusing point on a boundary of the lower portion.

This also prevents damages to the reflecting surfaces of the solid immersion mirror device.

According to an eighth aspect of the present invention, the solid immersion mirror device comprises: a light incident point positioned on a boundary of the medium; a first reflecting surface; and a second reflecting surface, wherein divergent light entering the medium from the light incident point is reflected from the first reflecting surface to be converted into collimated light while propagating in the medium, and the collimated light is reflected from the second reflecting surface and is then focused to a light focusing point on a boundary of the medium.

This increases the flexibility in determining the positional relationship between the light incident point and the light focusing point.

The present invention is also intended for a reproducing apparatus.

It is therefore a primary object of the present invention to provide an SIM of a more preferable new form.

It is a specific object of the present invention to provide a solid immersion mirror (SIM) capable of forming a proper light-focused spot when light from a light source enters the SIM, and a reproducing apparatus which uses such an SIM.

It is another specific object of the present invention to provide a solid immersion mirror capable of forming a proper light-focused spot without reflecting light from a lower surface thereof, and a reproducing apparatus which uses such an SIM.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a vertical sectional view showing a structure of the SIM according to a fourth preferred embodiment of the present invention;

FIG. 12 is a vertical sectional view showing a structure of the SIM according to a fifth preferred embodiment of the present invention;

FIG. 40 shows an example of a reflecting surface for conversion between diverging or converging light and collimated light;

FIGS. 44 and 45 are vertical sectional views showing structures of the SIM;

DESCRIPTION OF THE PREFERRED EMBODIMENTS

<1. First Preferred Embodiment>

<1.1 Construction of Recording/Reproducing Apparatus>

Figure 1:
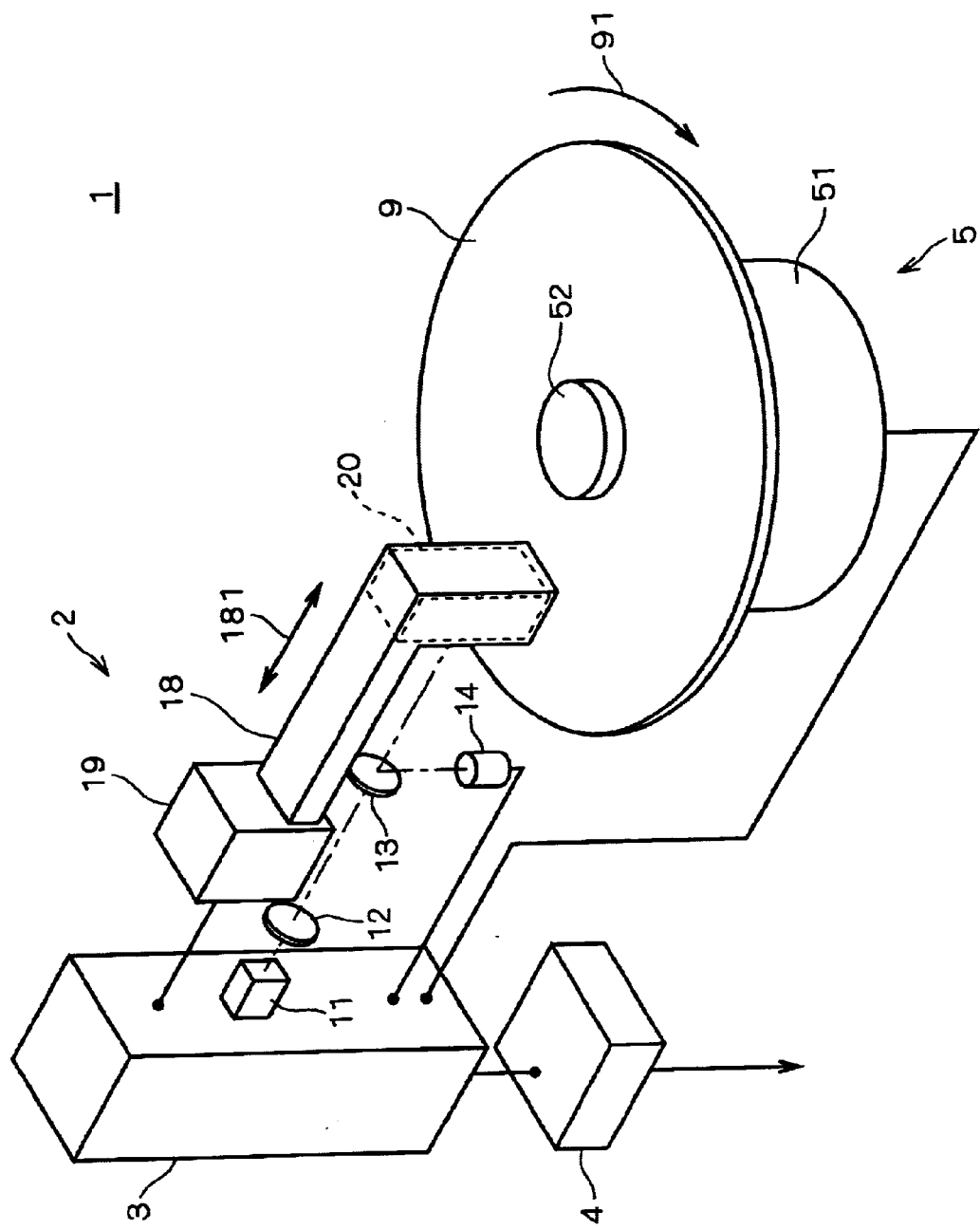
FIG. 1 is a schematic perspective view showing a construction of a recording/reproducing apparatus.

FIG. 1 is a schematic perspective view showing a construction of a recording/reproducing apparatus 1 according to a first preferred embodiment of the present invention. The recording/reproducing apparatus 1 comprises: a rotating mechanism 5 for rotating a recording medium 9 such as an optical disc in a predetermined direction as indicated by an arrow 91 while holding the recording medium 9 thereon; an optical head 2 for recording, reading (reproducing) and erasing signals on a recording surface of the recording medium 9; a controller 3 for providing a drive control signal to the optical head 2 and the rotating mechanism 5; and a signal processor 4 for processing a recording signal (including an erase signal) for the recording medium 9 and a reproducing signal from the recording medium 9.

The rotating mechanism 5 comprises a rotation driver 51 including a motor, and a rotating shaft 52. Based on the drive control signal from the controller 3, the rotation driver 51 rotates the rotating shaft 52 in the predetermined direction. The recording medium 9 is removable from the rotating shaft 52, and the recording medium 9 mounted to the rotating shaft 52 rotates integrally with the rotating shaft 52.

The optical head 2 comprises an optical unit 20 for recording, reproducing and erasing signals in proximity to the recording surface of the recording medium 9. For introducing light into the optical unit 20 and for detecting light from the optical unit 20, the optical head 2 further comprises a light source 11, a collimator lens 12, a beam splitter 13, and a photodetector 14. The optical unit 20 is held by an arm 18 which is retractable and extendable by an arm driver 19 in a radial direction of the recording medium 9 as indicated by an arrow 181.

Preferably, the light source 11 is a compact light source such as a semiconductor laser. The light emission from the light source 11 is controlled by a drive circuit provided in the controller 3. The light emitted from the light source 11 is collimated (or rendered substantially parallel) by the collimator lens 12. The collimated light passes through the beam splitter 13 and the optical unit 20, and is then focused near the recording surface of the recording medium 9 to form a minute spot.

Figure 2:
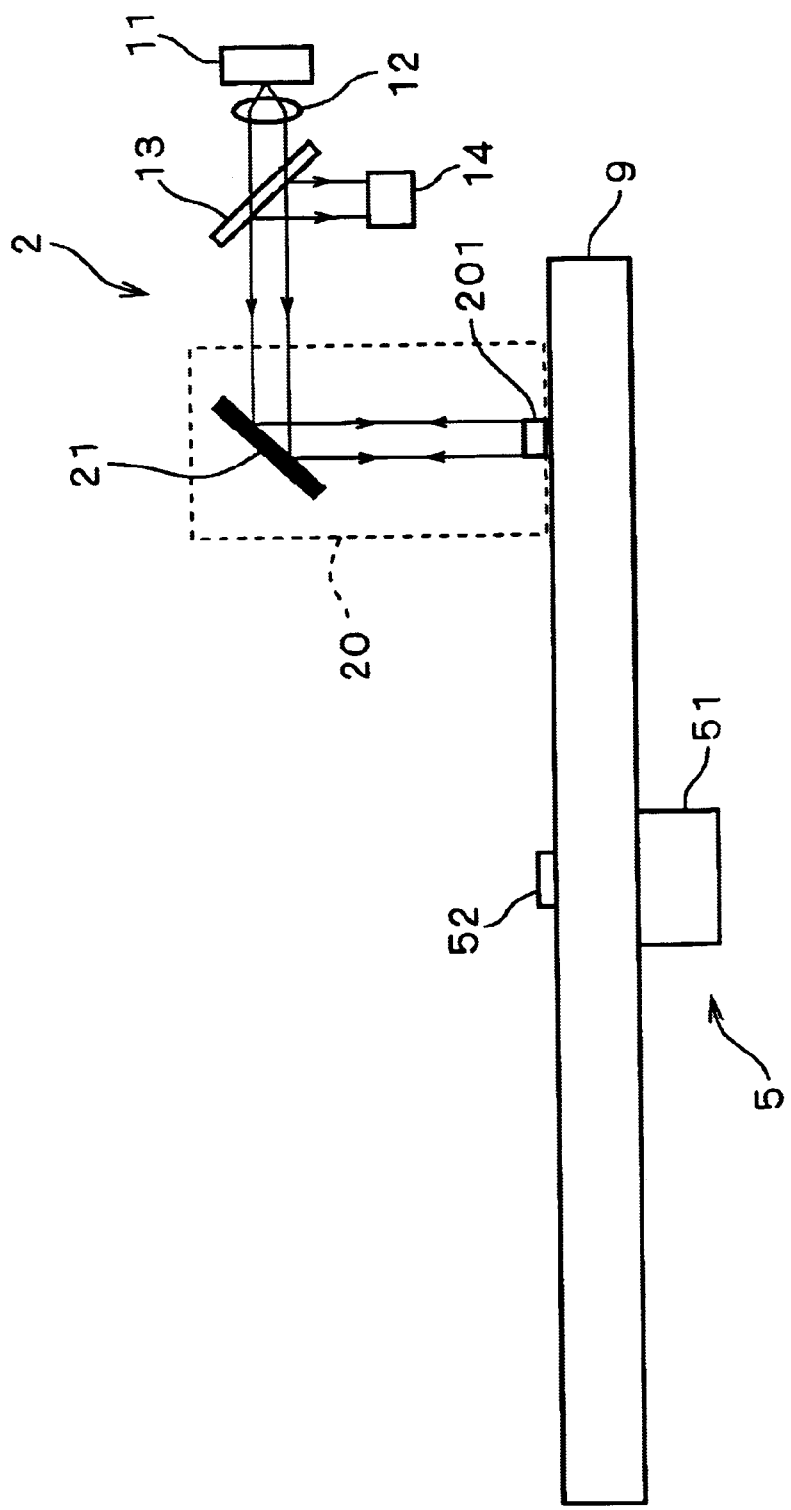
FIG. 2 shows a construction of an optical unit and a construction for directing light into and out of the optical unit.

FIG. 2 is a view showing a construction of the optical unit 20 and a construction for directing light into and out of the optical unit 20. In the optical unit 20 are disposed a mirror 21 and a solid immersion mirror (SIM) 201 which are arranged vertically. The light from the light source 11 is directed to the SIM 201 by an optical system including the collimator lens 12 and the mirror 21. The light directed into the SIM 201 is reflected in (or at a boundary of) the SIM 201, and is then focused to a predetermined light focusing point on a lower surface of the SIM 201.

The lower surface of the SIM 201 and the recording surface of the recording medium 9 are positioned very close to each other. This allows the recording, reproduction and erasure of information by the use of the light existing in the near-field region of the minute spot formed on the lower surface of the SIM 201. Since the SIM 201 is made principally of a high refractive index medium (a medium having a refractive index of greater than 1) to be described later, bringing the SIM 201 into proximity to the recording surface increases the numerical aperture of the optical unit 20 to provide a very minute spot formed on the lower surface. This achieves high-density recording.

The reflected light from the recording medium 9 (including light diffused in the near-field region of the minute spot) is directed out of the SIM 201 to the mirror 21 and then enters the beam splitter 13. The light is reflected from the beam splitter 13 and enters the photodetector 14. Thus, the information recorded on the recording medium 9 is read by the photodetector 14.

The light source 11, the collimator lens 12, the beam splitter 13 and the photodetector 14 are fixed in respectively predetermined positions. The arm 18 is extended and retracted along the optical axis of the light collimated by the collimator lens 12. Therefore, independently of the movement of the optical unit 20, the light from the light source 11 is directed to a predetermined position of the optical unit 20 and then to the SIM 201.

Referring again to FIG. 1, the arm 18 is extended and retracted in the substantially radial direction of the disc-shaped recording medium 9. Under the control of the controller 3, the arm 18 is moved by the arm driver 19 while the recording medium 9 is rotated. This allows the SIM 201 to access any region of the recording surface, with the light focusing point of the SIM 201 opposed to the recording surface. In other words, the arm 18, the arm driver 19 and the rotation driver 51 constitute a scanning mechanism for scanning the SIM 201 along the recording surface. The arm 18 need not always move linearly toward and away from the center of rotation of the recording medium 9. Instead, an arm of a predetermined length may pivot in a substantially radial direction of the recording medium 9 or other scanning mechanisms may be used.

In accordance with the rotation of the recording medium 9 and the extension and retraction of the optical unit 20, the signal processor 4 provides information to be recorded on the recording medium 9 through the controller 3 to the laser drive circuit, thereby to record (or erase) information on the recording medium 9. Further, the signal processor 4 processes a signal detected by the photodetector 14 through the controller 3, thereby to read the information recorded on the recording medium 9. The read information is outputted, as required, to other information processing equipment.

A variety of techniques utilizing light may be used to record, reproduce and erase information on the recording medium 9 in the recording/reproducing apparatus 1. One preferable technique usable herein is to change an optical characteristic of a photochromic material by the use of light with different wavelengths. In this technique, a recording layer made of a photochromic material is provided on the recording surface of the recording medium 9, and the light source 11 has a plurality of laser light emitting devices for generating light of wavelengths, e.g., for recording, reproduction and erasure. Light of wavelengths which change the optical characteristic of the photochromic material is used as the light of wavelengths for recording and erasure, and light of a wavelength which makes no change in the optical characteristic of the photochromic material is used as the light of the wavelength for reproduction.

The recording/reproducing apparatus 1 may record, erase and reproduce information by the use of light of only two wavelengths or may employ other principles which utilize light to record, erase and reproduce information. Alternatively, another apparatus may be used to record information whereas the apparatus shown in FIG. 1 is employed as a reproduction-only apparatus.

Additionally, the recording/reproducing apparatus 1, which employs the SIM 201 utilizing light reflection, does not cause a difference in degree of light focusing resulting from a light wavelength difference, i.e. chromatic aberration, and can properly focus light of various wavelengths. Therefore, the recording/reproducing apparatus 1 may be an apparatus capable of utilizing other recording media (e.g., CD and DVD).

<1.2 Structure of Solid Immersion Mirror>

Figure 3:
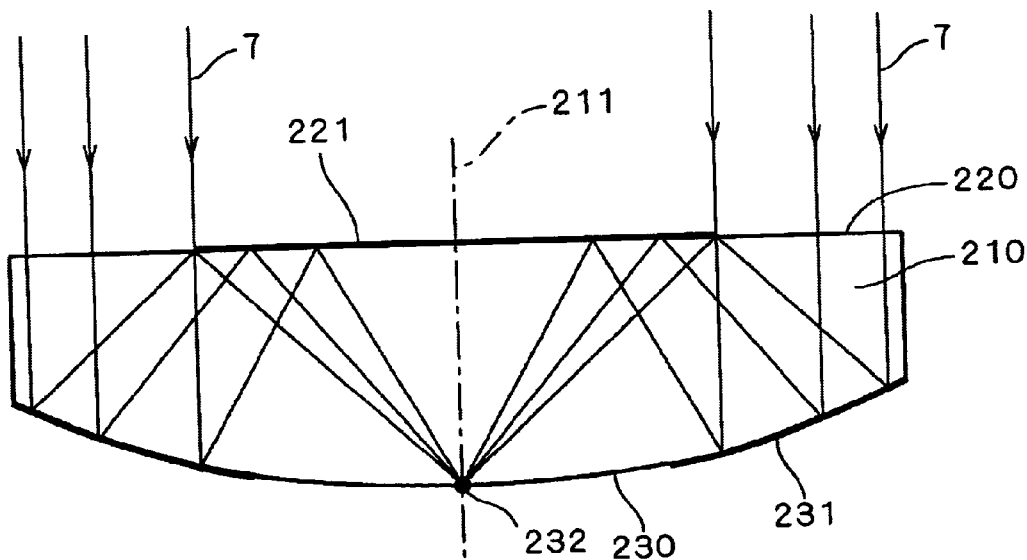
FIG. 3 is a vertical sectional view showing a structure of an SIM (solid immersion mirror) according to a first preferred embodiment of the present invention.

FIG. 3 is a vertical sectional view showing a structure of the SIM 201 to be provided in the optical unit 20.

The SIM 201 is made principally of a light-permeable high-refractive-index medium 210, and collimated light 7 enters the medium 210 in a direction from an upper surface 220 to a lower surface 230 thereof. The shape of the SIM 201 is a solid of revolution about an axis 211. A substantially annular first reflecting surface 231 is formed in an outer peripheral portion of the lower surface 230, and a circular second reflecting surface 221 is formed in a central portion of the upper surface 220.

These reflecting surfaces are formed by applying a reflective coating to portions of the lower and upper surfaces 230 and 220. The light 7 which impinges upon the entire upper surface 220 is intercepted by the second reflecting surface 221 in the central portion.

The light 7 enters the medium 210 in a direction parallel to the axis 211, and is reflected from the first reflecting surface 231. While converging, the reflected light impinges upon the second reflecting surface 221, and then is focused to a predetermined light focusing point 232 on the lower surface 230 (i.e., on a boundary of the medium 210).

Figure 4:
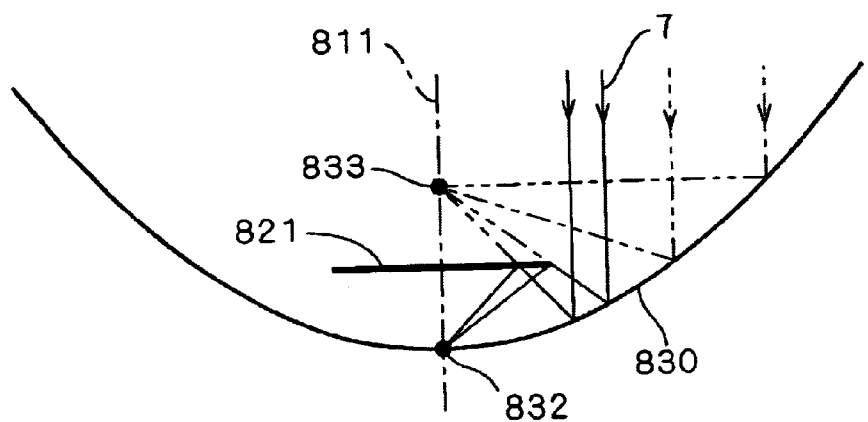
FIG. 4 is a view for illustrating a principle used when making a design determination of the shapes and positions of a first reflecting surface and a second reflecting surface in the SIM shown in FIG. 3.

FIG. 4 is a view for illustrating a principle used when making a design determination of the shapes and positions of the first reflecting surface 231 and the second reflecting surface 221.

Assuming that the collimated light 7 is incident on a parabola 830 in a direction parallel to a symmetry axis 811 of the parabola 830 and reflected from the parabola 830, the reflected light is focused onto the focus 833 of the parabola 830. When a line 821 is drawn which is a perpendicular bisector of a line segment connecting the focus 833 and the vertex 832 of the parabola 830, the focus 833 and the vertex 832 are conjugate to each other. Therefore, assuming that light is reflected from the underside of the line 821, the reflected light is focused onto the vertex 832.

Referring again to FIG. 3, a curved surface produced by rotating the parabola 830 shown in FIG. 4 about the symmetry axis 811 and used as a reflecting surface corresponds to the first reflecting surface 231, and a flat surface produced by rotating the line 821 about the symmetry axis 811 corresponds to the second reflecting surface 221. In other words, the first reflecting surface 231 is part of a curved surface (whose concave side is used as the reflecting surface) produced by rotating the parabola 830 about the symmetry axis 811, and the second reflecting surface 221 is part of a flat surface which is a perpendicular bisector of the line segment connecting the focus 833 and the vertex 832.

By determining the shapes and positions of the first reflecting surface 231 and the second reflecting surface 221 as described above, the collimated light 7 entering the medium 210 from the second reflecting surface 221 side (or from above the second reflecting surface 221) along the axis 211 is reflected sequentially from the first and second reflecting surfaces 231 and 221 while propagating in the medium 210, and is then focused to the light focusing point 232 corresponding to the vertex 832.

Figure 5:
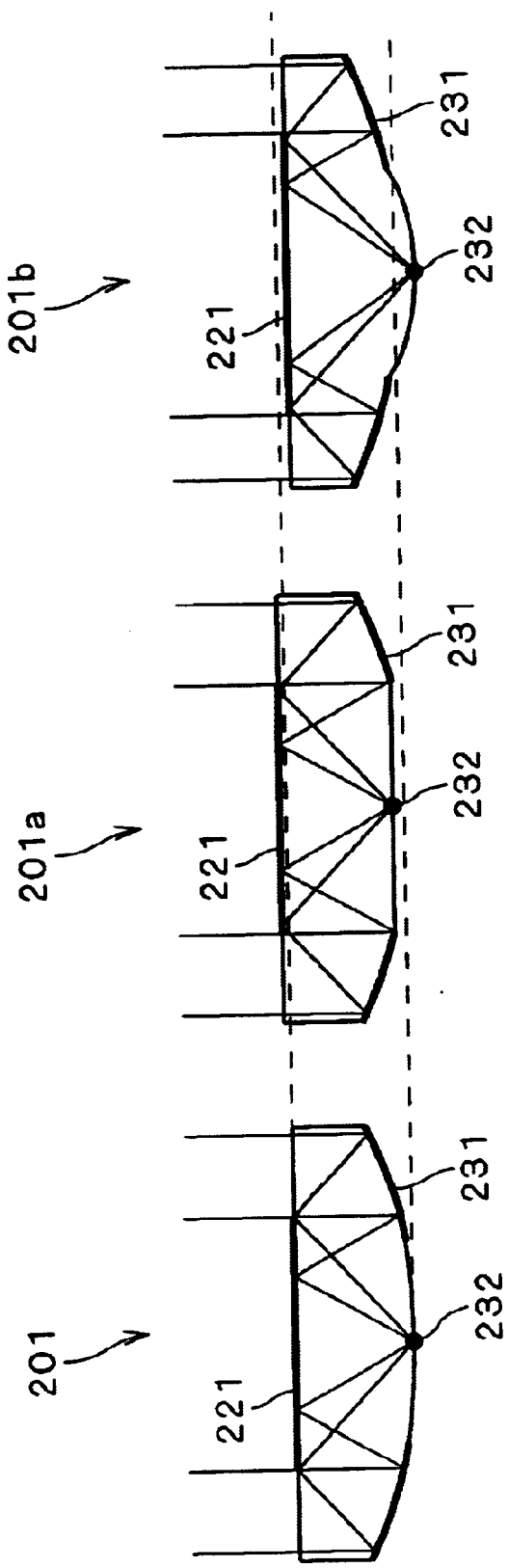
FIG. 5 illustrates modifications of a light focusing point of the SIM shown in FIG. 3.

The lower surface 230 need not be of the shape produced by rotating the parabola extending to near the light focusing point 232, and therefore may be of the shape of a flat surface or the like near the light focusing point 232. Further, the position of the line 821 in FIG. 4 may be changed in an upward or downward direction to upwardly or downwardly move the position of the point to which light is focused. More particularly, as shown in FIG. 5, changes may be made to a distance between the first reflecting surface 231 and the second reflecting surface 221 to design an SIM 201a and an SIM 201b in which the position of the light focusing point 232 is modified along the axis 211.

The light focused to the light focusing point 232 forms a minute spot, and bringing the recording surface of the recording medium 9 into proximity to the light focusing point 232 allows information recording, reproduction and erasure utilizing near-field light.

Moreover, since the SIM 201 is rotationally symmetric about the axis 211 serving as a center of rotation, light is incident on the light focusing point 232 uniformly from therearound to form a properly circular spot. Consequently, the recording/reproducing apparatus 1 can perform proper recording, reproducing and erasing operations.

<2. Second Preferred Embodiment>

Figure 6:
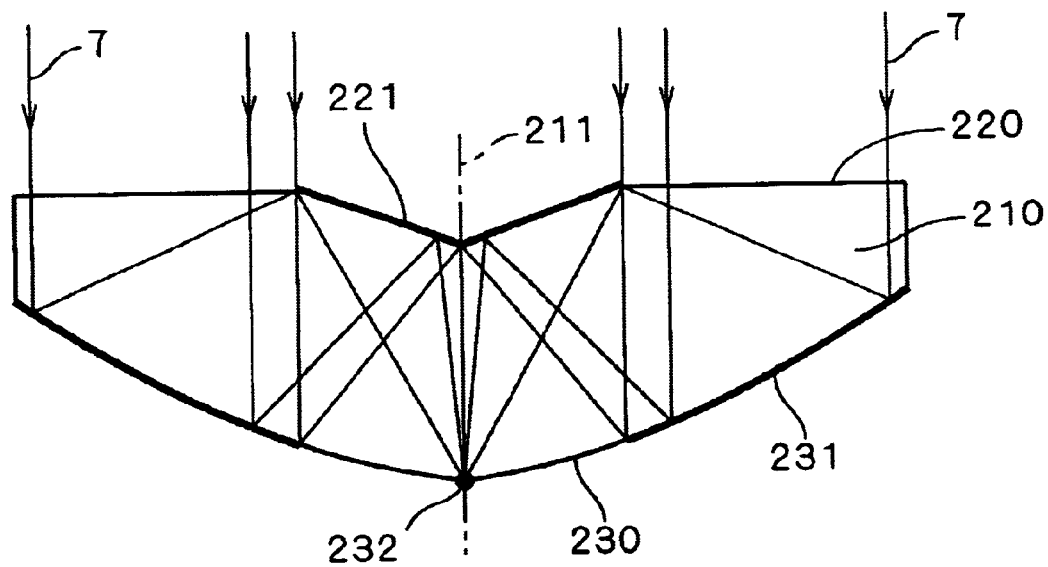
FIG. 6 is a vertical sectional view showing a structure of the SIM according to a second preferred embodiment of the present invention.

Another form of the SIM will be described according to a second preferred embodiment of the present invention. FIG. 6 is a vertical sectional view showing an SIM 202 according to the second preferred embodiment.

Like the SIM 201 according to the first preferred embodiment, the SIM 202 has the shape of a solid of revolution about the axis 211. The first reflecting surface 231 of the SIM 202 is also substantially annular, but the second reflecting surface 221 is a conical surface with its vertex pointing toward the lower surface 230.

Figure 7:
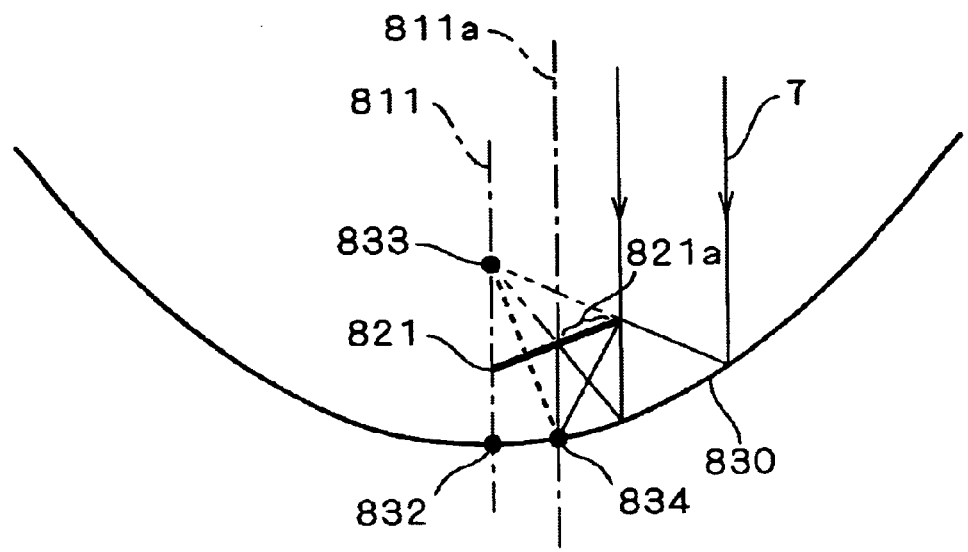
FIG. 7 is a view for illustrating a principle used when making a design determination of the shapes and positions of the first reflecting surface and the second reflecting surface in the SIM shown in FIG. 6.

FIG. 7 is a view for illustrating a principle used when making a design determination of the shapes and positions of the first reflecting surface 231 and the second reflecting surface 221.

Assuming that the collimated light 7 is incident on the parabola 830 in a direction parallel to the symmetry axis 811 of the parabola 830 and reflected from the parabola 830 as described with reference to FIG. 4, the reflected light is focused onto the focus 833 of the parabola 830. A point 834 is now established which is spaced apart from the vertex 832 and lies on the parabola 830, and the line 821 is drawn which is a perpendicular bisector of a line segment connecting the focus 833 and the point 834. Assuming that light is reflected from the underside of the line 821, the reflected light is focused onto the point 834.

The SIM 202 shown in FIG. 6 has a shape produced by rotating part of the figure which lies on the opposite side of an axis 811a from the vertex 832 (i.e., which lies to the right of the axis 811a as viewed in FIG. 7) about the axis 811a, the axis 811a being parallel to the symmetry axis 811 and passing through the point 834. In other words, the lower surface 230 is part of a curved surface (whose concave side is used as the reflecting surface) produced by rotating the right-hand part of the parabola 830 with respect to the axis 811a, and the second reflecting surface 221 formed at the upper surface 220 is part of a conical surface produced by rotating a right-hand line segment 821a of the line 821 with respect to the axis 811a. A point corresponding to the point 834 is established as the light focusing point 232 on the boundary of the medium 210.

Thus, the collimated light 7 entering the medium 210 from the second reflecting surface 221 side (or from above the second reflecting surface 221) along the axis 211 is reflected sequentially from the first and second reflecting surfaces 231 and 221 while propagating in the medium 210, and is then focused to the light focusing point 232. Also in the SIM 202, light is incident on the light focusing point 232 uniformly from therearound to form a proper circular spot.

A surface outside the second reflecting surface 221 through which the light 7 enters the medium 210 (or part of the upper surface 220 other than the second reflecting surface 221) is a flat surface perpendicular to the incident direction of the light 7 to prevent occurrence of chromatic aberration.

In the SIM 202, the light entering the medium 210 through near the outer periphery of the second reflecting surface 221 is permitted to be reflected from the first reflecting surface 231 and thereafter from about the center of the second reflecting surface 221 as shown in FIG. 6. In other words, with reference to FIG. 7, light passing through near the right-hand end of the line segment 821a is permitted to be reflected from the parabola 830 and thereafter from near the left-hand end of the line segment 821a (or near the intersection of the line 821 and the axis 811a) and be incident on the point 834 along the axis 811a.

Such shapes and positions of the first reflecting surface 231 and the second reflecting surface 221 allow part of the light reflected from the first reflecting surface 231 to be reflected from near the intersection of the axis 211 and the second reflecting surface 221 toward the light focusing point 232, whereby a light component having an incident angle of approximately 0° (with respect to the axis 211) is incident on the light focusing point 232.

In general, the increase in incident angle of the light incident on the light focusing point 232 increases the numerical aperture of the optical system to intensify the intensity distribution of a formed spot in a central minute region. However, if only light having a greater incident angle is incident on the light focusing point 232 but light having a smaller incident angle is not incident on the light focusing point 232, a ring-shaped bright region (known as side lobe) is formed also on the periphery of the spot. Such an incident state of light is referred to hereinafter as "intermediate vacancy."

When the intermediate vacancy occurs, an ideal spot is not formed in which the intensity is the highest at the center thereof and gradually decreases toward the periphery thereof, and the efficiency of use of light is reduced.

The SIM 202 can direct light from directly over the light focusing point 232, i.e. from near the center of the second reflecting surface 221, to the light focusing point 232 to prevent the intermediate vacancy, thereby achieving the formation of a proper spot.

Since light having a smaller incident angle (i.e. a light component having a smaller numerical aperture) forms a larger spot at the light focusing point 232, it can be considered that the degree of intermediate vacancy is desired to be controlled. In FIG. 7, as the right-hand end of the line segment 821a is moved to a further rightwardly extended position, the degree of intermediate vacancy becomes greater. Therefore, the degree of intermediate vacancy may be controlled by adjusting the position of the right-hand end of the line segment 821a, i.e., by adjusting the size of the second reflecting surface 221 of FIG. 6. This achieves the formation of an ideal spot, as required.

Figure 8:
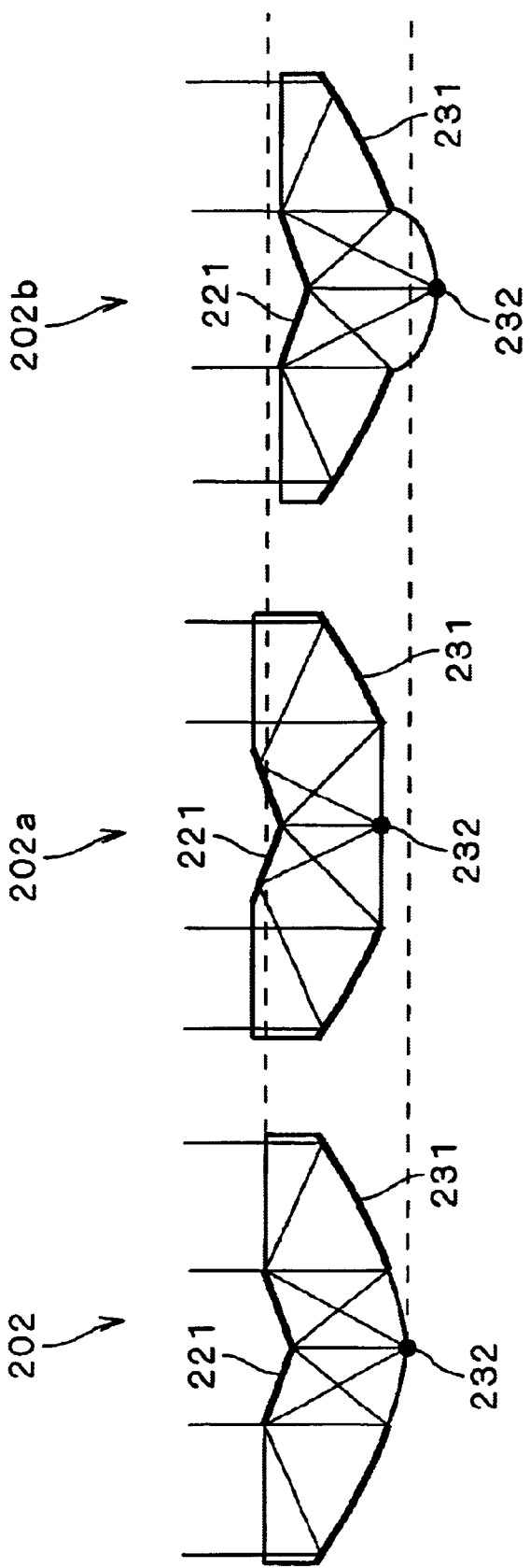
FIG. 8 illustrates modifications of the light focusing point of the SIM shown in FIG. 6.

The lower surface 230 need not be of the shape produced by rotating the parabola extending to near the light focusing point 232, and therefore may be of the shape of a flat surface or the like near the light focusing point 232. Further, the position of the line 821 in FIG. 7 may be changed in an upward or downward direction to upwardly or downwardly move the position of the point to which light is focused. More particularly, as shown in FIG. 8, changes may be made to the distance between the first reflecting surface 231 and the second reflecting surface 221 to design an SIM 202a and an SIM 202b in which the position of the light focusing point 232 is modified along the axis 211.

<3. Third Preferred Embodiment>

Figure 9:
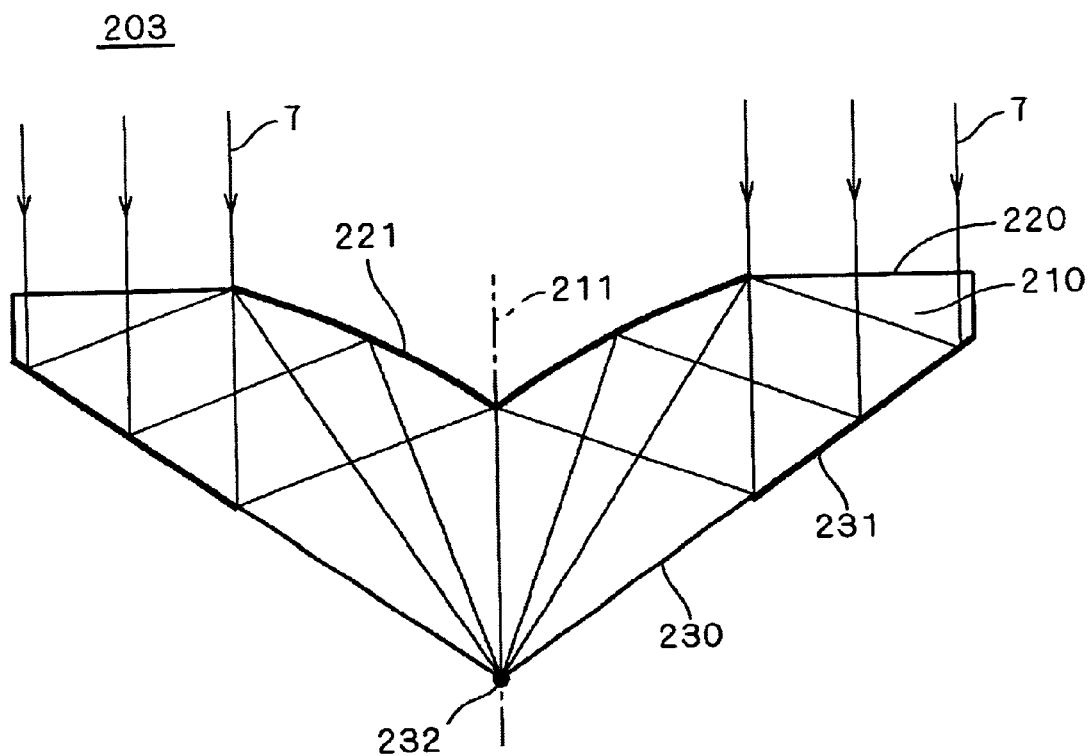
FIG. 9 is a vertical sectional view showing a structure of the SIM according to a third preferred embodiment of the present invention.

Still another form of the SIM will be described according to a third preferred embodiment of the present invention. FIG. 9 is a vertical sectional view showing an SIM 203 according to the third preferred embodiment.

The SIM 203 has the shape of a solid of revolution about the axis 211. The lower surface 230 of the SIM 203 is part of a conical surface with its vertex pointing downward, and the first reflecting surface 231 is substantially annular. The second reflecting surface 221 is a curved surface protruding inwardly of the medium 210. In the SIM 203, the second reflecting surface 221 as viewed in section contributes to light focusing.

Figure 10:
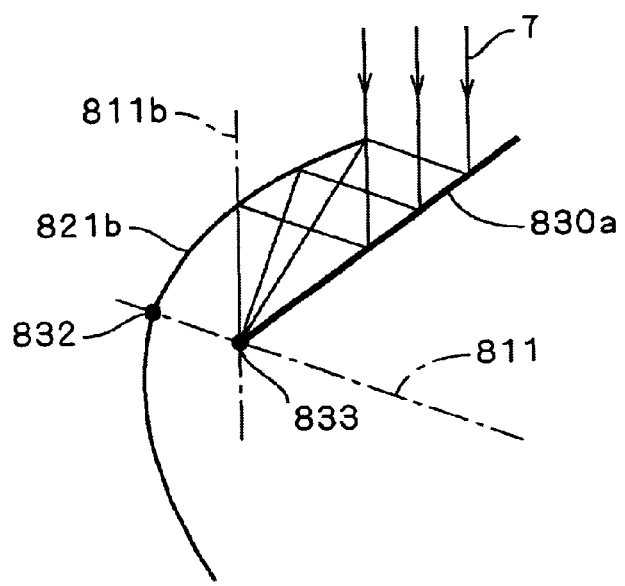
FIG. 10 is a view for illustrating a principle used when making a design determination of the shapes and positions of the first reflecting surface and the second reflecting surface in the SIM shown in FIG. 9.

FIG. 10 is a view for illustrating a principle used when making a design determination of the shapes and positions of the first reflecting surface 231 and the second reflecting surface 221.

With reference to FIG. 10, assuming that the collimated light 7 is reflected from a line 830a passing through the focus 833 of a parabola 821b, the reflected light from the line 830a is parallel to the symmetry axis 811 of the parabola 821b. Therefore, the light assumed to be reflected from the line 830a and the parabola 821b is focused onto the focus 833.

The SIM 203 shown in FIG. 9 has a shape produced by rotating parts of the parabola 821b and the line 830a which lie on the opposite side of an axis 811b from the vertex 832 about the axis 811b, the axis 811b being parallel to the direction of travel of the light 7 and passing through the focus 833. In other words, the lower surface 230 and the first reflecting surface 231 are parts of a conical surface (or a side surface of a cone having an axis of rotation parallel to the incident direction of the light 7 and a vertex pointed downward) produced by rotating the line 830a about the axis 811b, and the second reflecting surface 221 is part of a curved surface (whose focus 833 side is used as the reflecting surface) produced by rotating the parabola 821b about the axis 811b.

A surface outside the second reflecting surface 221 through which the light 7 enters the medium 210 (or part of the upper surface 220 other than the second reflecting surface 221) is a flat surface perpendicular to the incident direction of the light 7 to prevent occurrence of chromatic aberration.

In the SIM 203, the light 7 entering the medium 210 through near the outer periphery of the second reflecting surface 221 is permitted to be reflected from the first reflecting surface 231 and thereafter be incident from about the center of the second reflecting surface 221, i.e. from directly over the light focusing point 232, on the light focusing point 232, as in the second preferred embodiment. Thus, the SIM 203 can prevent the intermediate vacancy (or adjust the degree of intermediate vacancy). This allows light to be incident on the light focusing point 232 uniformly from therearound while preventing the intermediate vacancy, to form a proper spot.

<4. Fourth Preferred Embodiment>

The first reflecting surface 231 has a parabolic sectional shape as taken along a plane including the axis 211 in the first and second preferred embodiments, and the second reflecting surface 221 has a parabolic sectional shape as taken along a plane including the axis 211 in the third preferred embodiment. That is, either the first reflecting surface 231 or the second reflecting surface 221 functions to focus light as viewed in section. In these preferred embodiments, the use of the parabolic sectional shape facilitates the design of the relationship between the light focusing point 232 and the reflecting surfaces.

Unlike the first to third preferred embodiments, the design may be prepared so that both of the first and second reflecting surfaces 231 and 221 focus light as viewed in section. FIG. 11 shows an example of the first and second reflecting surfaces 231 and 221 both functioning to focus the collimated light 7 to the light focusing point 232, as viewed in section taken along a plane including the axis 211. In an SIM 204 shown in FIG. 11, each of the first and second reflecting surfaces 231 and 221 is a curved surface having a sectional shape of a curved line, i.e. part of a curved surface produced by rotating a curved line about the axis 211, and part of the upper surface 220 of the medium 210 other than the second reflecting surface 221 is a flat surface perpendicular to the incident direction of the light 7. This improves design flexibility.

The SIM 204 shown in FIG. 11 also allows light to be incident on the light focusing point 232 uniformly from therearound while preventing the intermediate vacancy, to form a proper spot.

The first reflecting surface 231 and the second reflecting surface 221 according to the first to fourth preferred embodiments are shown as formed by applying a reflective coating to the surfaces of the medium 210. However, the need to provide the reflective coating may be eliminated if the medium 210 has a sufficiently high refractive index. Additionally, the first reflecting surface 231 and the lower surface 230 need not be smoothly continuous surfaces but may be discontinuous.

<5. Fifth Preferred Embodiment>

Description will be given on an SIM 205 according to a fifth preferred embodiment of the present invention which uses the entire upper surface 220 of the medium 210 as a light incident region through which the light 7 enters the medium 210.

The SIM 205 shown in FIG. 12 has the shape of a solid of revolution about the an axis 211. The upper surface 220 of the medium 210 is a flat surface, and the lower surface 230 is part of a curved surface produced by rotating a parabola about the symmetry axis. The relationship between the upper surface 220 and the lower surface 230 of the SIM 205 is similar to that of the SIM 201 of the first preferred embodiment.

The upper surface 220 transmits the collimated light 7 incident thereon from above in a direction parallel to the axis 211, and the lower surface 230 acts as the first reflecting surface for reflecting the light 7. On the other hand, the entire upper surface 220 also functions as the second reflecting surface for reflecting the light reflected from the lower surface 230. Therefore, the light 7 passing through the upper surface 220 is reflected sequentially from the lower surface 230 and the upper surface 220, and then focused to the light focusing point 232.

Unlike the SIM 201 shown in FIG. 3, the SIM 205 with the entire upper surface 220 functioning as a surface on which the light 7 is incident can efficiently utilize the incident light to form a spot at the light focusing point 232. Additionally, light with various incident angles is incident on the light focusing point 232 from various directions, thereby to form a proper spot free from the intermediate vacancy.

Figure 13:
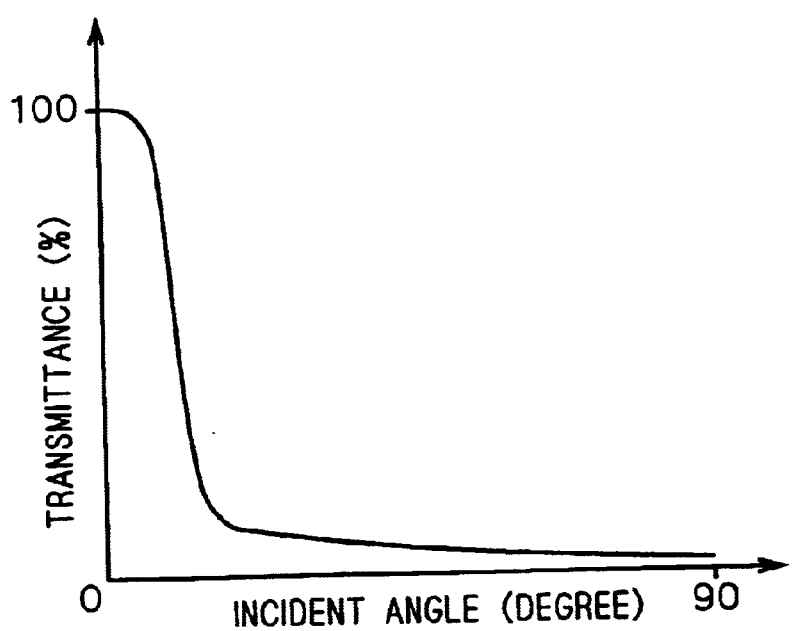
FIG. 13 is a graph showing a transmittance characteristic of an upper surface of the SIM shown in FIG. 12 when the upper surface is a selectively reflecting surface which utilizes a difference in incident angle.

The upper surface 220 used herein is a surface having the property of transmitting the light 7 from outside and reflecting the light reflected from the lower surface 230. The light 7 from outside impinges on the upper surface 220 in a direction perpendicular to the upper surface 220, and light from inside impinges on the upper surface 220 at relatively large incident angles. Therefore, a surface is usable herein which has a property such that the transmittance thereof approaches 100% only when the incident angle is close to 0° as shown in FIG. 13. Such a surface having the property of selectively transmitting the light with small incident angles is readily obtainable by applying a multi-layer dielectric film coating.

The surface having the selectively reflective (transmissive) property of transmitting the incident light from outside and reflecting the light from inside may be attained by the use of polarization of light.

Figure 14:
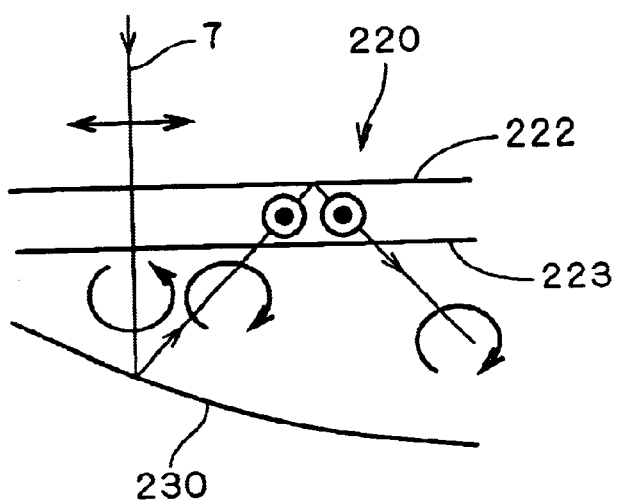
FIG. 14 shows a structure near the upper surface of the SIM shown in FIG. 12 when the upper surface is a selectively reflecting surface which utilizes a difference in polarization direction.

FIG. 14 shows a structure near the upper surface 220 when a difference in polarization direction is utilized. Referring to FIG. 14, a polarization-based separation reflecting surface 222 serves substantially as the upper surface 220, and a wave plate 223 is provided between the upper surface 220 and the lower surface 230. The polarization-based separation reflecting surface 222 has the property of transmitting light polarized in a predetermined polarization direction and reflecting light polarized in a polarization direction perpendicular to the predetermined polarization direction of the polarized light passing therethrough. The wave plate 223 changes the state of polarization of light passing therethrough by providing an optical path difference of one-quarter wavelength between the phases of polarized light components having oscillation directions perpendicular to each other. The polarization-based separation reflecting surface 222 and the wave plate 223 may be bonded together either directly or with a medium therebetween.

Examples of the polarization-based separation reflecting surface 222 usable herein include a polarization beam splitter array disclosed in Japanese Patent Application Laid-Open No. 5-19208 (1993), a flat-plate polarization-based separator disclosed in Japanese Patent Application Laid-Open No. 5-215919 (1993), and a reflective polarizer disclosed in National Publication of Translation No. 9-506985 (1997). A product embodying the polarization-based separation reflecting surface 222 which may be used herein includes, for example, a thin-film reflective polarizing film available under the trade name of DBEF (from SUMITOMO 3M Limited).

With reference to FIG. 14, it is assumed that the light 7 entering the medium 210 is linearly polarized light having a polarization direction (oscillation direction) parallel to the plane of the figure and the polarization-based separation reflecting surface 222 transmits such polarized light. Then, the light 7 transmitted through the wave plate 223 becomes circularly polarized light. When reflected from the lower surface 230, the light 7 is transmitted through the wave plate 223 again to become polarized light having a polarization direction perpendicular to the plane of the figure. This causes the light from the lower surface 230 to be reflected from the polarization-based separation reflecting surface 222 toward the light focusing point 232. Consequently, the light entering the medium 210 by way of the upper surface 220 is reflected sequentially from the lower and upper surfaces 230 and 220, and is then focused to the light focusing point 232 efficiently.

As described above, the SIM 205 can focus the light 7 incident on the entire upper surface 220 to the light focusing point 232 efficiently by applying a multi-layer dielectric coating to the upper surface 220 or by providing the polarization-based separation reflecting surface 222 and the wave plate 223. Further, the SIM 205 which uses light with small incident angles to form a spot can prevent the intermediate vacancy, to form a proper spot.

Figure 15:
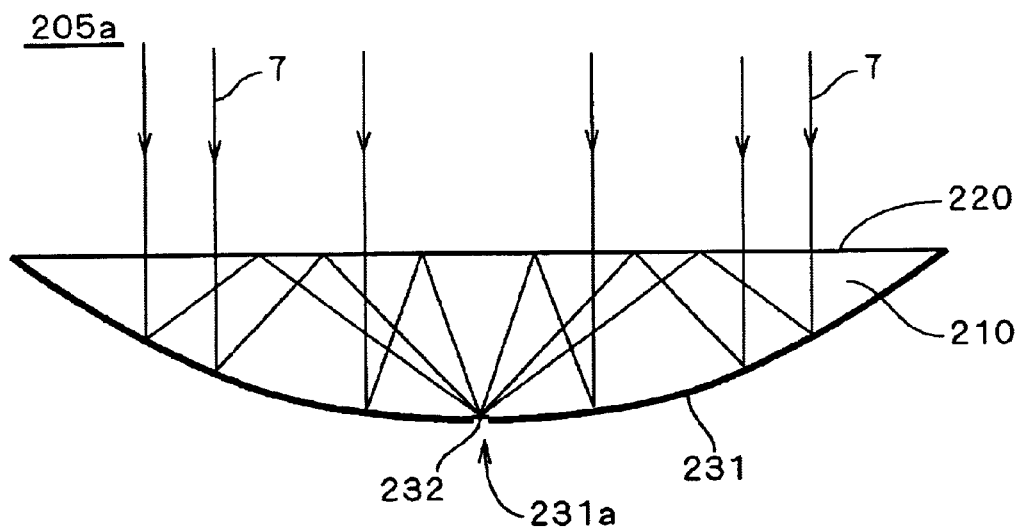
FIG. 15 shows the SIM of FIG. 12 with a reflective coating applied to a lower surface thereof to form the first reflecting surface.

FIG. 15 shows an SIM 205a with a reflective coating applied to the lower surface 230 of the SIM 205 shown in FIG. 12 to form the first reflecting surface 231. The SIM 205a has the first reflecting surface 231 formed by applying the coating to the substantially entire lower surface, and a minute opening 231a formed at the light focusing point 232 for directing light outwardly.

The coating in other regions than the minute opening 231a near the light focusing point 232 also functions as a mask for preventing light from being released outwardly at other positions than the light focusing point 232. Preferably, the minute opening 231a has a diameter of not greater than about 1 μm. Further, when only light in the near-field region of the light focusing point 232 is directed outwardly from the minute opening 231a for use in recording and reproduction, the diameter of the minute opening 231a preferably is not greater than the wavelength of light.

The mask near the light focusing point 232 need not double as the first reflecting surface 231. Another purpose-built mask may be formed on the surface of the medium 210 near the light focusing point 232. Moreover, the mask may be formed near the light focusing point 232 in any one of the other preferred embodiments.

<6. Sixth Preferred Embodiment>

Figure 16:
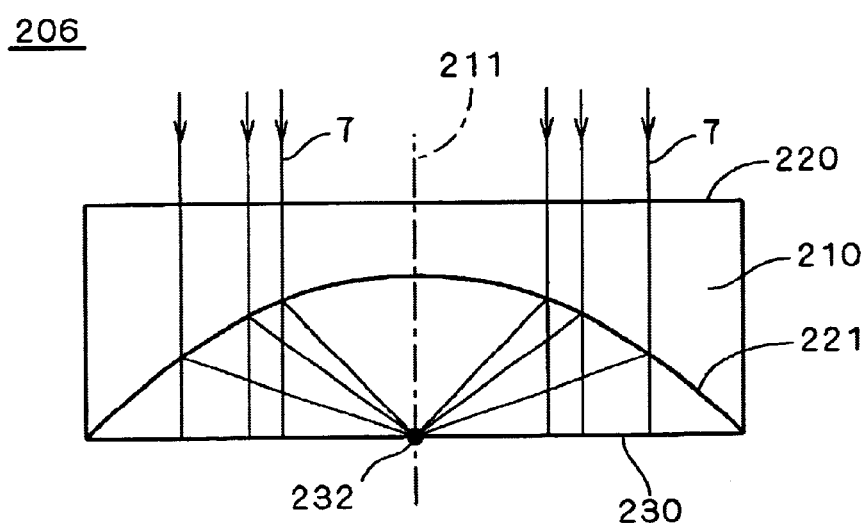
FIG. 16 is a vertical sectional view showing a structure of the SIM according to a sixth preferred embodiment of the present invention.

Although the upper surface 220 shown in FIG. 14 is the selectively reflecting surface which transmits light polarized in the predetermined polarization direction and reflects light polarized in a polarization direction perpendicular to the predetermined polarization direction of the polarized light passing therethrough, the selectively reflecting surface which is the second reflecting surface 221 may be present inside the medium 210, as shown in FIG. 16. This allows the shape of the second reflecting surface 221 to be made independent of the shape of the upper surface 220.

An SIM 206 shown in FIG. 16 has the upper and lower surfaces 220 and 230 which are flat surfaces perpendicular to the direction of travel of the collimated light 7. The upper surface 220 is flat to prevent the occurrence of chromatic aberration. The second reflecting surface 221 is part of a curved surface produced by rotating about the axis 211 a parabola having a symmetry axis (corresponding to the axis 211) parallel to the direction of travel of the light 7. The light focusing point 232 on the lower surface 230 corresponds to the focus of the parabola.

Figure 17:
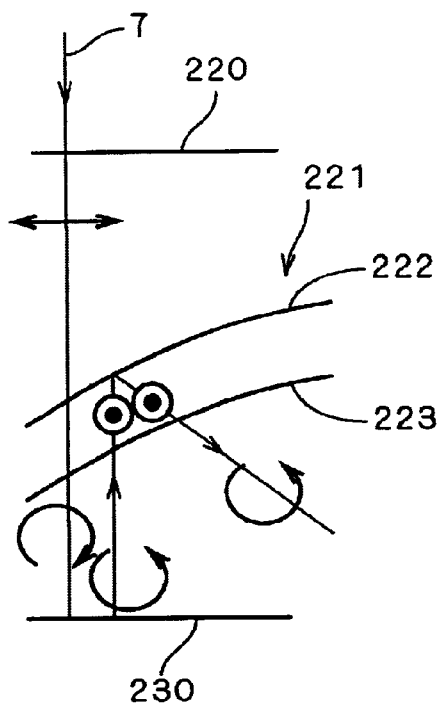
FIG. 17 is a view for illustrating a structure near the second reflecting surface of the SIM shown in FIG. 16.

FIG. 17 is a view for illustrating a structure near the second reflecting surface 221. As shown in FIG. 17, the polarization-based separation reflecting surface 222 serves substantially as the second reflecting surface 221, and the quarter wave plate 223 (similar to the wave plate shown in FIG. 14) is provided between the second reflecting surface 221 and the lower surface 230. The polarization-based separation reflecting surface 222 transmits light polarized in a predetermined polarization direction and reflects light polarized in a polarization direction perpendicular to the predetermined polarization direction. In FIG. 17, the polarized light having a polarization direction (oscillation direction) parallel to the plane of the figure is shown as transmitted through the polarization-based separation reflecting surface 222, and the polarized light having a polarization direction perpendicular to the plane of the figure is shown as reflected from the polarization-based separation reflecting surface 222.

Even when the second reflecting surface 221 is provided inside the medium 210, the light 7 having the polarization direction parallel to the plane of the figure is transmitted through the upper surface 220, the polarization-based separation reflecting surface 222 and the wave plate 223 to become circularly polarized light which in turn is reflected from the lower surface 230. Thereafter, the light is transmitted through the wave plate 223 again to become polarized light having the polarization direction perpendicular to the plane of the figure, which in turn is reflected from the polarization-based separation reflecting surface 222. Consequently, the light 7 entering the medium 210 by way of the entire upper surface of the SIM 206 is focused to the light focusing point 232, and the incident light is efficiently utilized to form a spot.

Further, the SIM 206 which also uses light with small incident angles to form a spot can prevent the intermediate vacancy, to form a proper spot.

Additionally, the SIM 206 allows light with a greater incident angle than does the SIM 205, i.e. a light component which provides a greater numerical aperture, to be incident on the light focusing point 232, thereby to produce a smaller spot formed at the light focusing point 232.

The SIM 206 shown in FIG. 16 which has the medium 210 including upper and lower portions on opposite sides of the second reflecting surface 221 respectively is produced, for example, by forming the shapes of the upper and lower portions of the medium 210 by a glass molding process, mounting the wave plate 223 and the polarization-based separation reflecting surface 222 to one of the upper and lower portions of the medium 210, and then bonding the upper and lower portions of the medium 210 together using an optically matched adhesive or the like. Of course, it is not necessary that the polarization-based separation reflecting surface 222 and the wave plate 223 are in contact with each other at the second reflecting surface 221, but other media may be present therebetween. The shape of the wave plate 223 is not limited to the shape which extends along the shape of the polarization-based separation reflecting surface 222.

<7. Modifications of First to Sixth Preferred Embodiments>

The preferred embodiments according to the present invention have been described hereinabove. The present invention, however, is not limited to the above-mentioned preferred embodiments, but various modifications may be made thereto.

For instance, the SIMs according to the first to third, fifth and sixth preferred embodiments utilize parabolas as the sectional shapes of the reflecting surfaces to focus the collimated light easily and properly. However, the incident light may be gradually converging light or gradually diverging light, and the curved lines of the reflecting surfaces as viewed in section may be modified as required. Even if such modifications are made to the SIM shown in FIG. 6 or 9, the SIM capable of preventing or controlling the intermediate vacancy is attainable. Even if similar modifications are made to the SIM shown in FIG. 12 or 16, efficient focusing of the incident light is achieved.

The first reflecting surface 231 and the second reflecting surface 221 are formed at the surfaces of the medium 210 (or the surfaces themselves serve as the reflecting surfaces) in the above-mentioned preferred embodiments except the sixth preferred embodiment. However, the first reflecting surface 231 and the second reflecting surface 221 may be positioned inside the medium 210. When the light 7 is regarded as incident on the upper surface of the medium 210, the first reflecting surface 231 and the second reflecting surface 221 may be positioned in relatively lower and upper parts of the medium 210, respectively.

Although the first reflecting surface 231 or the second reflecting surface 221 contributes to light focusing as viewed in section in the fifth and sixth preferred embodiments, both of the first and second reflecting surfaces 231 and 221 may contribute to light focusing as viewed in section.

As described above, the first reflecting surface 231 and the second reflecting surface 221 (except when used as the selectively reflecting surface) may be part of the surface of the medium 210, in which case it is preferable that the medium 210 has a sufficiently high refractive index. For example, the refractive index of the medium 210 is preferably not less than 1.5 when most of the light incident on the reflecting surfaces has an incident angle of not less than 45°.

Figure 18:
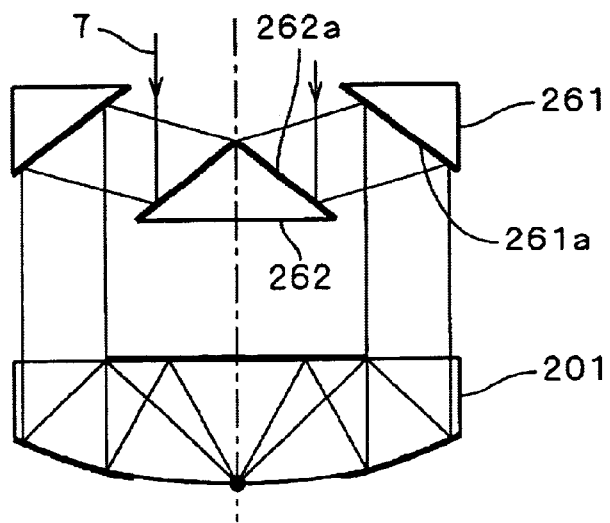
FIG. 18 shows a construction for converting light into ring-shaped light and the SIM.
Figure 19:
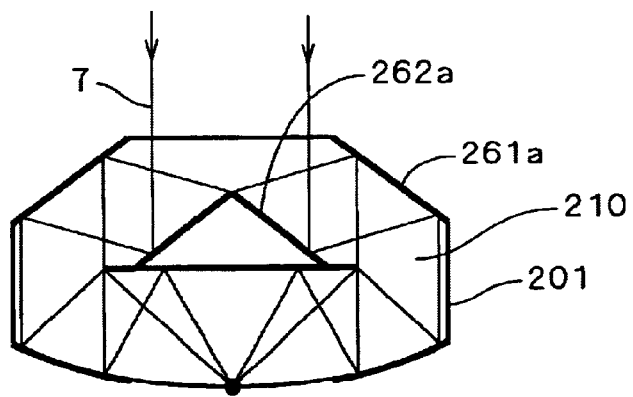
FIG. 19 shows an integrated structure of the construction for converting light into ring-shaped light and the SIM.

In the first to fourth preferred embodiments, the light 7 enters the medium 210 by way of the outer periphery of the second reflecting surface 221, in which case a construction for rendering the collimated light 7 ring-shaped may be added for effective use of light, as shown in FIG. 18 or FIG. 19. Referring to FIG. 18, a ring-shaped member 261 having a substantially annular reflecting surface 261a and a conical member 262 having a reflecting surface 262a convert the light 7 into ring-shaped light which in turn enters the SIM 201. Referring to FIG. 19, the reflecting surface 261a of FIG. 18 is formed on a surface of the medium 210 and the reflecting surface 262a of FIG. 18 is provided inside the medium 210. This provides the SIM 201 in which a construction for rendering the light 7 ring-shaped and a construction for focusing light are integrated together. Thus, the construction for rendering the light 7 ring-shaped may be present outside the SIM or substantially inside the SIM. Other techniques may be used to render the light 7 ring-shaped.

For the SIM employing the polarization-based separation reflecting surface 222, the incident light 7 is not limited to the polarized light. In other words, only at least part of the incident light is required to pass through the second reflecting surface 221. The wave plate is not limited to that which changes the state of polarization of light by one-quarter wavelength, but any means may be used which can provide a 90° change in polarization direction between the light passing through the polarization-based separation reflecting surface 222 and the light incident on the polarization-based separation reflecting surface 222 after being reflected from the lower surface 230.

In the recording/reproducing apparatus 1 according to the first preferred embodiment, the SIM 201 may be fixed to the arm 18 or may be of a floating slider type mounted to the arm 18 in a manner similar to a magnetic head of a hard disc. The same is true for the SIMs according to the remaining preferred embodiments.

In the above-mentioned preferred embodiments, the light from the recording surface of the recording medium 9 of the recording/reproducing apparatus 1 is illustrated as directed through the SIM into the photodetector 14. Instead, a photodetector for detecting released light resulting from scattering of near-field light near the light focusing point 232 from the recording surface may be provided outside the optical head 2 to read information.

The SIMs described above may be employed in other than the apparatus for recording, reproducing or erasing information on the recording medium 9. For example, the SIMs may be employed in a master exposure apparatus for producing a master optical disc or a microscope for observation of samples.

Although the configurations of the SIM have been described using the light propagating in the medium 210 when the light 7 is directed from above the upper surface 220 of the SIM into the medium 210, it is not always necessary that the light is directed from above the second reflecting surface 221 when the SIM is used. For example, when the SIM is used for a near-field optical microscope for observation of a light-permeable sample in a transparent mode, illumination is provided in a direction opposite from the direction of observation, and near-field light near the surface of the sample is received by the SIM and directed outwardly through the upper surface 220.

<8. Seventh Preferred Embodiment>

The recording/reproducing apparatus according to a seventh preferred embodiment of the present invention will now be described. In the seventh preferred embodiment, description will be given on an SIM 207 of a different form which is used in place of the above-mentioned SIMs 201 to 206 in the above-mentioned recording/reproducing apparatus.

Figure 20:
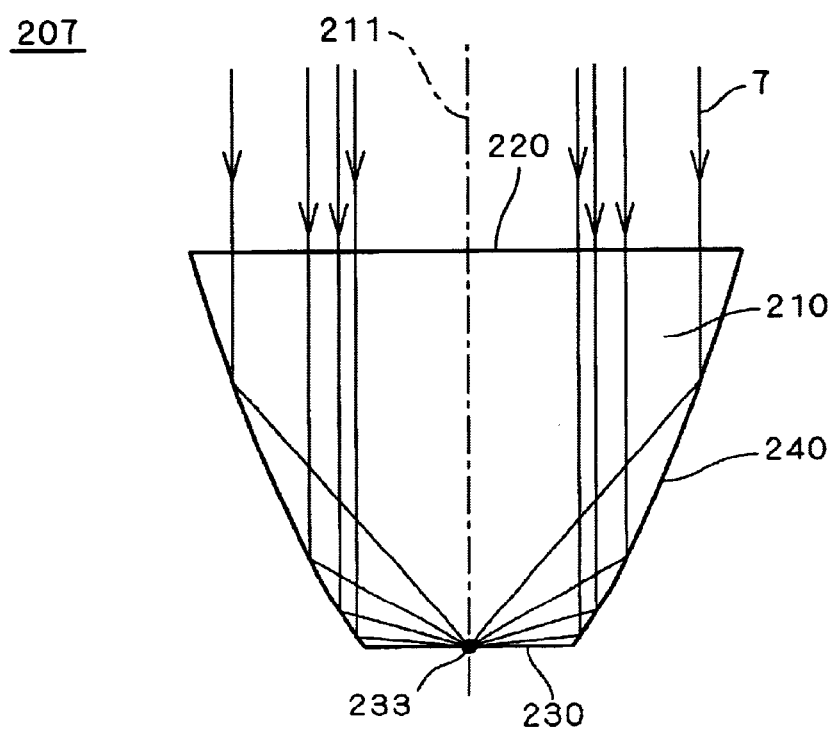
FIG. 20 is a vertical sectional view showing a structure of the SIM (solid immersion mirror)

FIG. 20 is a vertical sectional view showing a structure of the SIM 207 to be provided in the optical unit 20.

The SIM 207 is made principally of the light-permeable high-refractive-index medium 210, and the collimated light 7 enters the medium 210 in a direction from the upper surface 220 formed in an upper portion of the medium 210 to the lower surface 230 formed in a lower portion thereof. The SIM 207 has the shape of a solid of revolution about the axis 211. A side surface between the upper surface 220 and the lower surface 230 is a substantially tubular reflecting surface (referred to hereinafter as a "side reflecting surface") 240. In the SIM 207, the light 7 enters the medium 210 in a direction parallel to the axis 211, is reflected once from the side reflecting surface 240, and then is focused to a predetermined light focusing point 233 on the lower surface 230 (i.e., on a boundary of the medium 210).

Figure 21:
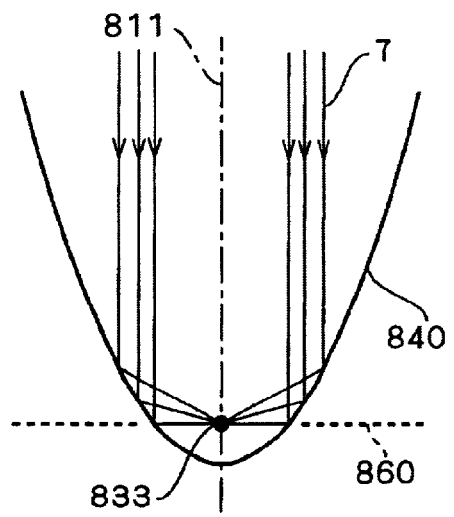
FIG. 21 is a view for illustrating a principle used when making a design determination of the shape of a side reflecting surface and the position of the light focusing point in the SIM shown in FIG. 20.

FIG. 21 is a view for illustrating a principle used when making a design determination of the shape of the side reflecting surface 240 and the position of the light focusing point 233.

Assuming that the collimated light 7 is incident on a parabola 840 in a direction parallel to the symmetry axis 811 of the parabola 840 and reflected from the parabola 840, the reflected light is focused onto the focus 833 of the parabola 840. Referring again to FIG. 20, part of a curved surface produced by rotating the parabola 840 about the symmetry axis 811 shown in FIG. 21 corresponds to the side reflecting surface 240, and part of a plane 860 passing through the focus 833 and perpendicular to the symmetry axis 811 corresponds to the lower surface 230. The position of the focus 833 corresponds to the light focusing point 233.

The upper surface 220 is a flat surface perpendicular to the direction of travel of the light 7 to prevent occurrence of chromatic aberration in the light spot formed at the light focusing point 233.

By determining the shape of the side reflecting surface 240 and the position of the light focusing point 233 as described above, the collimated light 7 entering the medium 210 by way of the upper surface 220 along the axis 211, that is, in a downward direction of the medium 210 is reflected once from the side reflecting surface 240 while propagating in the medium 210, and is then focused to the light focusing point 233. Therefore, bringing the recording surface of the recording medium 9 into proximity to the light focusing point 233 allows information recording, reproduction and erasure utilizing near-field light.

Since the SIM 207 is rotationally symmetric about the axis 211 serving as a center of rotation, light is incident on the light focusing point 233 uniformly from therearound to form a properly circular spot. Consequently, the recording/reproducing apparatus 1 can perform proper recording, reproducing and erasing operations.

In the SIM 207, the light is reflected only once from the side reflecting surface 240 before being focused. In other words, the SIM 207 can focus the light to the light focusing point 233 without reflecting the light from the lower surface 230 thereof. In case of damages to the lower surface 230 in a position other than the light focusing point 233, the focusing of light is not influenced by the damages.

Further, the SIM 207 in which the lower end of the side reflecting surface 240 laterally surrounds the light focusing point 233 allows the light to impinge on the light focusing point 233 at a large incident angle (with respect to the axis 211) (or provides a maximum incident angle of approximately 90°), thereby forming a spot using a light component providing a large numerical aperture of the SIM 207. This achieves the formation of a minute spot to improve the recording density of the recording medium 9.

Figure 22:
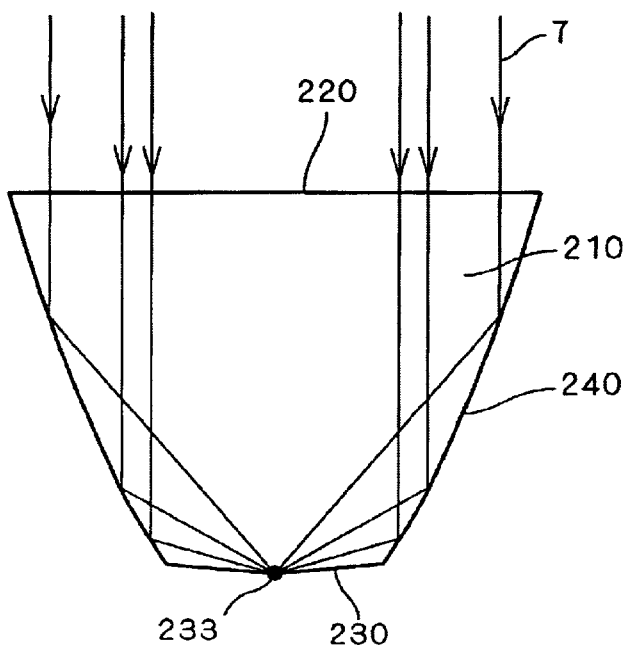
FIGS. 22 through 26 are vertical sectional views showing other examples of the SIM.

On the other hand, an SIM having the lower surface 230 which is not flat may be easily designed since the lower surface 230 is not used as a reflecting surface. FIG. 22 illustrates an SIM 207a having the lower surface 230 which is a near-flat conical surface with the light focusing point 233 at its vertex (or a conical surface with its vertex pointing downward). The lower surface 230 of the SIM 207a is inclined from the light focusing point 233 toward the side reflecting surface 240 to prevent contact between the recording surface of the recording medium 9 and the SIM 207a if the SIM 207a is slightly tilted.

The SIM 207a can also prevent damages to the reflecting surface since the lower surface 230 is not used as the reflecting surface. Further, the SIM 207a in which the lower end of the side reflecting surface 240 substantially laterally surrounds the light focusing point 233 can increase the maximum incident angle to reduce the spot size.

The shape of the lower surface 230 may be changed as required. For a floating slider type optical head similar to the magnetic head of a hard disk, for example, only part of the lower surface 230 which has the possibility of contacting the recording medium 9 may be formed as an inclined surface.

In the SIMs shown in FIGS. 20 and 22, the side surface of the medium 210 is used as the side reflecting surface 240. When the side surface itself is used as the reflecting surface and a predetermined relationship is satisfied between the refractive index of the medium 210 and the incident angle of the light 7 on the side surface (side reflecting surface) 240, the light is totally reflected from the side surface. More specifically, light which satisfies the relationship n×sin θ'≧1 is totally reflected where n is the refractive index of the medium and θ' is the incident angle on the side surface.

In the SIM 207 shown in FIG. 20, a minimum incident angle on the side surface is obtained near the boundary between the lower surface 230 and the side reflecting surface 240 and is approximately 45°. Thus, if the refractive index of the medium 210 is not less than 1/sin 45°, all of the light incident on the side reflecting surface 240 is totally reflected, that is, is directed onto the light focusing point 233.

In the case of the SIM 207a shown in FIG. 22, since the minimum incident angle is slightly greater than 45° by the amount corresponding to the inclination of the lower surface 230, the refractive index of the medium is required only to be slightly less than 1/sin 45°. Therefore, the incident light is totally reflected when the refractive index of the medium is not less than 1/sin θ where θ is the minimum incident angle on the side surface.

In light of the foregoing, the refractive index of the medium 210 in the SIM 207 and the SIM 207a is preferably not less than 1.41 (approximately 1/sin 45°) and more preferably not less than 1.5. Such a refractive index is readily obtained by the use of glass and crystal as the medium 210. The medium 210 may be made of any material which has a refractive index of not less than 1.4.

Figure 23:
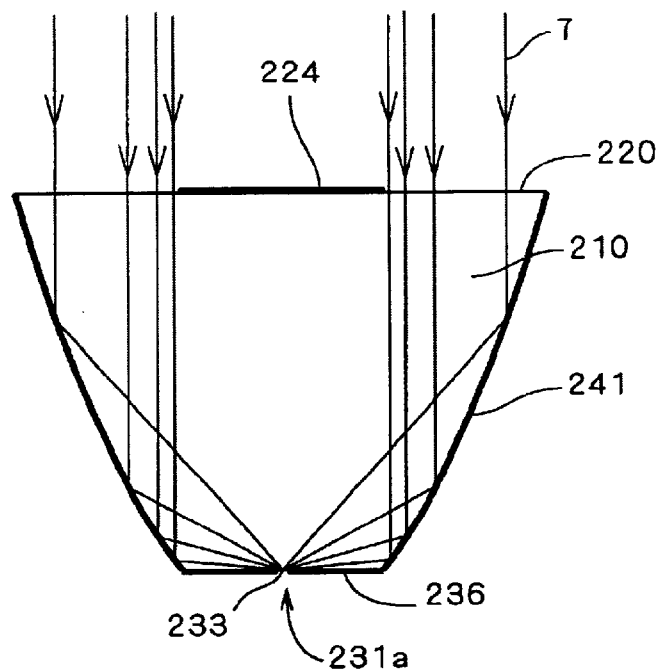

FIG. 23 illustrates an SIM 207b produced by applying various types of coating to the SIM 207 shown in FIG. 20.

The SIM 207b has a light shielding coat 224 formed in a central region of the upper surface 220 for intercepting the light 7, and a reflective coat 241 formed on the side surface thereof. A mask 236 is formed on the lower surface of the SIM 207b to prevent light from leaking outwardly from other than the light focusing point 233. These coats (including the mask) are formed, for example, as metal films.

The light shielding coat 224 on the upper surface 220 is formed to cause only part of the light 7 incident on the upper surface 220 which reaches the side surface to enter the medium 210. This causes only required light to enter the medium 210 and prevents unwanted light from propagating in the medium 210.

The reflective coat 241 on the side surface is formed to ensure that the side surface acts as the reflecting surface, and also prevents unwanted light from entering the medium 210 from outside.

The mask 236 on the lower surface is formed to prevent unwanted light from being released from the lower surface onto the recording medium 9. Preferably, the minute opening 231a formed at the light focusing point 233 is not greater than approximately 1 μm in diameter (or a dimension regarded substantially as a diameter). Further, when only the light in the near-field region of the light focusing point 233 is directed outwardly from the minute opening 231a for use in recording, reproduction and erasure, the diameter of the minute opening 231a preferably is not greater than the wavelength of light.

The mask 236 on the medium surface near the light focusing point 233 may be formed integrally with the reflective coat 241.

The light shielding coat 224, the reflective coat 241 and the mask 236 may be formed on the SIM 207a shown in FIG. 22 or some of these coats may be selectively formed.

Figure 24:
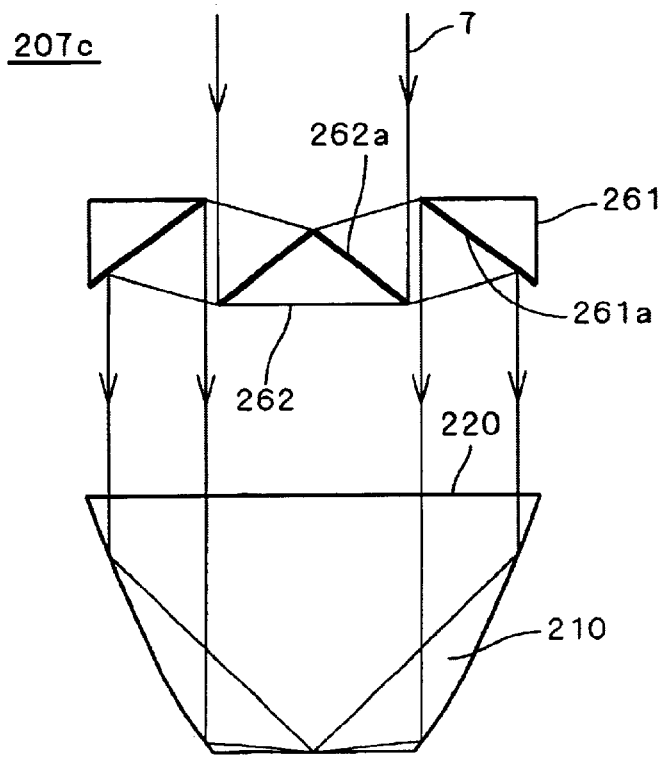

FIG. 24 illustrates an SIM 207c having a construction for converting the collimated light 7 in the form of a light beam of a circular sectional shape into light in the form of a light beam of a ring-shaped sectional shape (i.e. a cylindrical light beam), in place of the light shielding coat 224 shown in FIG. 23. Specifically, the SIM 207c shown in FIG. 24 comprises the ring-shaped member 261 having the substantially annular reflecting surface 261a and the conical member 262 having the reflecting surface 262a, both of which are disposed over the medium 210 similar in shape to that of the SIM 207 shown in FIG. 20. Sequential reflection of the light 7 in the form of the light beam of the circular sectional shape from the reflecting surface 262a and the reflecting surface 261a converts the light 7 into the cylindrical light beam which in turn is incident on the upper surface 220 of the medium 210. The reflecting surface 261a and the reflecting surface 262a are provided by coating the surfaces of the respective members 261 and 262 with metal or the like for use as the reflecting surfaces.

The provision of such a construction achieves the effective use of the light 7 and eliminates the need for the light shielding coat 224 shown in FIG. 23. The member 262 may be mounted to the upper surface 220 to become integral with the medium 210.

Figure 25:
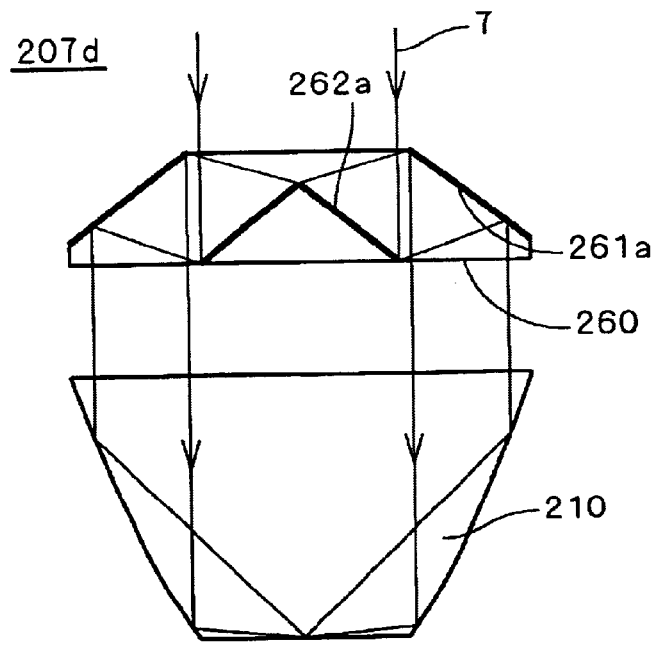
Figure 26:
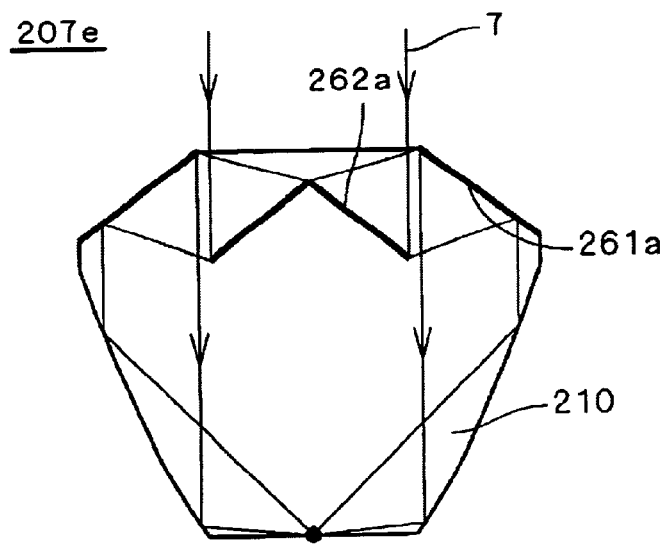

FIG. 25 shows an SIM 207d in which the reflecting surfaces 261a and 262a shown in FIG. 24 are formed at the surface of and inside a single member 260. FIG. 26 shows an SIM 207e in which the member 260 shown in FIG. 25 and the medium 210 are integrated together. As shown in FIGS. 25 and 26, the reflecting surfaces 261a and 262a may be disposed in various positions.

The construction for converting the light 7 into the cylindrical light beam is not limited to those shown in FIGS. 24 through 26, but a variety of other techniques may be used. For example, a prism may be used in place of the reflecting surfaces to generate a cylindrical light beam if the problem of chromatic aberration does not occur (e.g., when light with only one wavelength is used).

Figure 27:
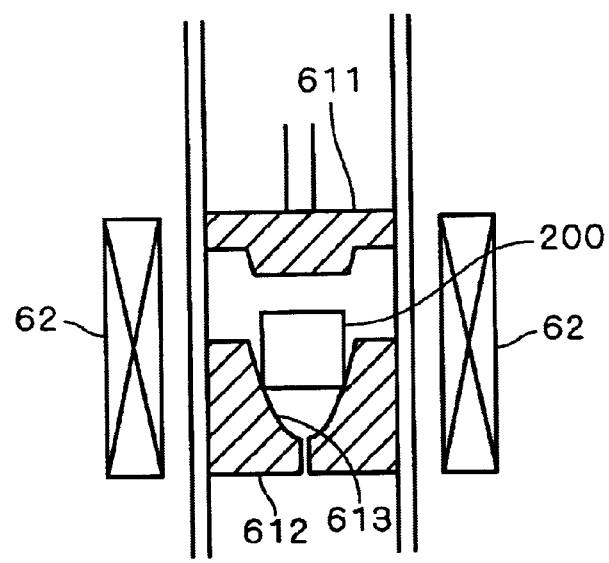
FIGS. 27 and 28 are views for illustrating a method of producing the SIM.

Next, description will be given on a method of manufacturing the SIM described above. FIG. 27 shows a glass material 200 (e.g. lanthanum silica crown glass) being pressed by a top mold 611 and a bottom mold 612. The bottom mold 612 has a surface 613 conforming to the side surface of the SIM. While being heated by a heating mechanism 62, the glass material 200 is pressed into the shape shown in FIG. 28.

Figure 28:
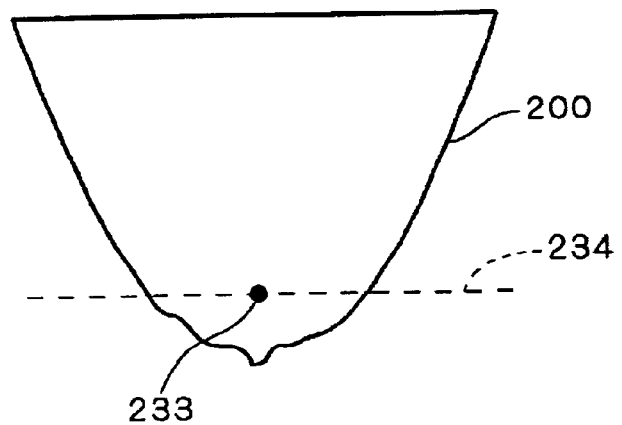

Thereafter, the glass material 200 shown in FIG. 28 is cut along the plane 234 including the light focusing point 233, and the resultant cut surface is mirror-polished. As a result, the SIM 207 shown in FIG. 20 is produced. In this manner, the SIM 207 is produced by pressing the glass material 200 so that unnecessary part thereof is removed downwardly.

Figure 29:
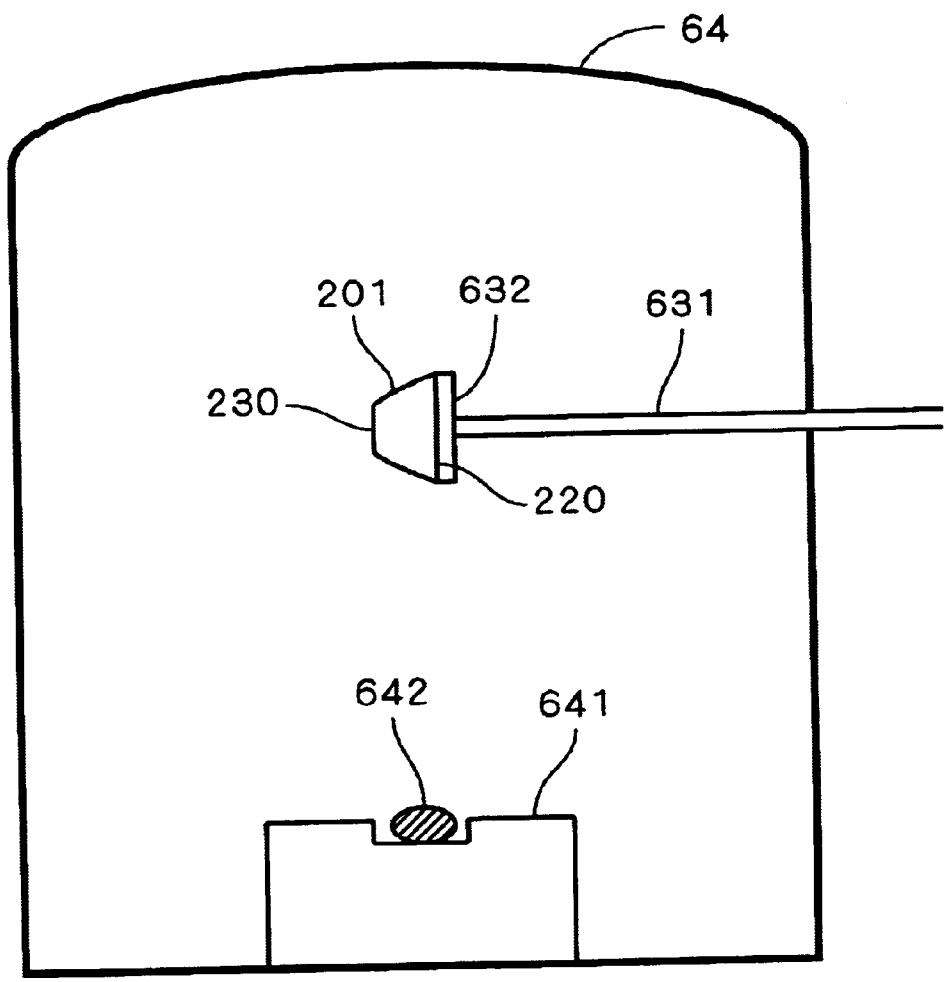
FIG. 29 is a view for illustrating a method of forming a reflective coat on the SIM.

FIG. 29 is a view for illustrating the process of forming the reflective coat 241 shown in FIG. 23 on the SIM 207 shown in FIG. 20.

A resist is previously formed on the upper and lower surfaces 220 and 230 of the SIM 207, and the upper surface 220 is mounted to a holder 632 at the tip of a rotary shaft 631. The rotary shaft 631 is rotated about an axis thereof while aluminum 642 on a heating table 641 is heated in a high vacuum environment within a vacuum chamber 64. This deposits aluminum on the side surface (i.e., the side reflecting surface 240) of the SIM 207. After the deposition of aluminum, the resist is removed. Thus, the formation of the reflective coat 241 is completed.

The seventh preferred embodiment according to the present invention has been described hereinabove. The present invention, however, is not limited to the above-mentioned preferred embodiment, but various modifications may be made thereto.

For instance, the SIM according to the seventh preferred embodiment utilizes a parabola as the sectional shape of the reflecting surface to focus the collimated light easily and properly. However, the incident light may be gradually converging light or gradually diverging light, and the curved line of the reflecting surface as viewed in section may be modified as required.

The side reflecting surface 240 need not be completely tubular but may be substantially tubular in shape. For example, a plurality of ring-shaped reflecting surfaces arranged vertically may be used as the side reflecting surface 240 or a plurality of vertically extending reflecting surfaces arranged around the axis 211 may be used as the side reflecting surface 240.

The light shielding coat 224 in the seventh preferred embodiment may be in the form of other than a coat, e.g. in the form of a disc-shaped light shielding member. Additionally, the light shielding member may be provided either outside or inside the medium 210, and may employ any member which can intercept the central region of the incident light.

In the recording/reproducing apparatus 1 according to the seventh preferred embodiment, the SIM 207 may be fixed to the arm 18 or may be of a floating slider type mounted to the arm 18 in a manner similar to a magnetic head of a hard disc.

In the above-mentioned preferred embodiment, the light from the recording surface of the recording medium 9 of the recording/reproducing apparatus 1 is illustrated as directed through the SIM into the photodetector 14. Instead, the photodetector may be provided outside the optical head 2 to detect the light resulting from scattering of near-field light near the light focusing point 233 from the recording surface, not through the SIM.

The SIM described above may be employed in other than the apparatus for recording, reproducing or erasing information on the recording medium 9. For example, the SIM may be employed in a master exposure apparatus for producing a master optical disc or a microscope for observation of samples.

Although the configurations of the SIM have been described using the light propagating in the medium 210 when the light 7 is directed from above the upper surface 220 of the SIM into the medium 210, it is not always necessary that the light is directed from above the upper surface 220 when the SIM is used. For example, when the SIM is used for a near-field optical microscope for observation of a light-permeable sample in a transparent mode, illumination is provided in a direction opposite from the direction of observation, and near-field light near the surface of the sample is received by the SIM and directed outwardly through the upper surface 220.

<9. Eighth Preferred Embodiment>

Figure 30:
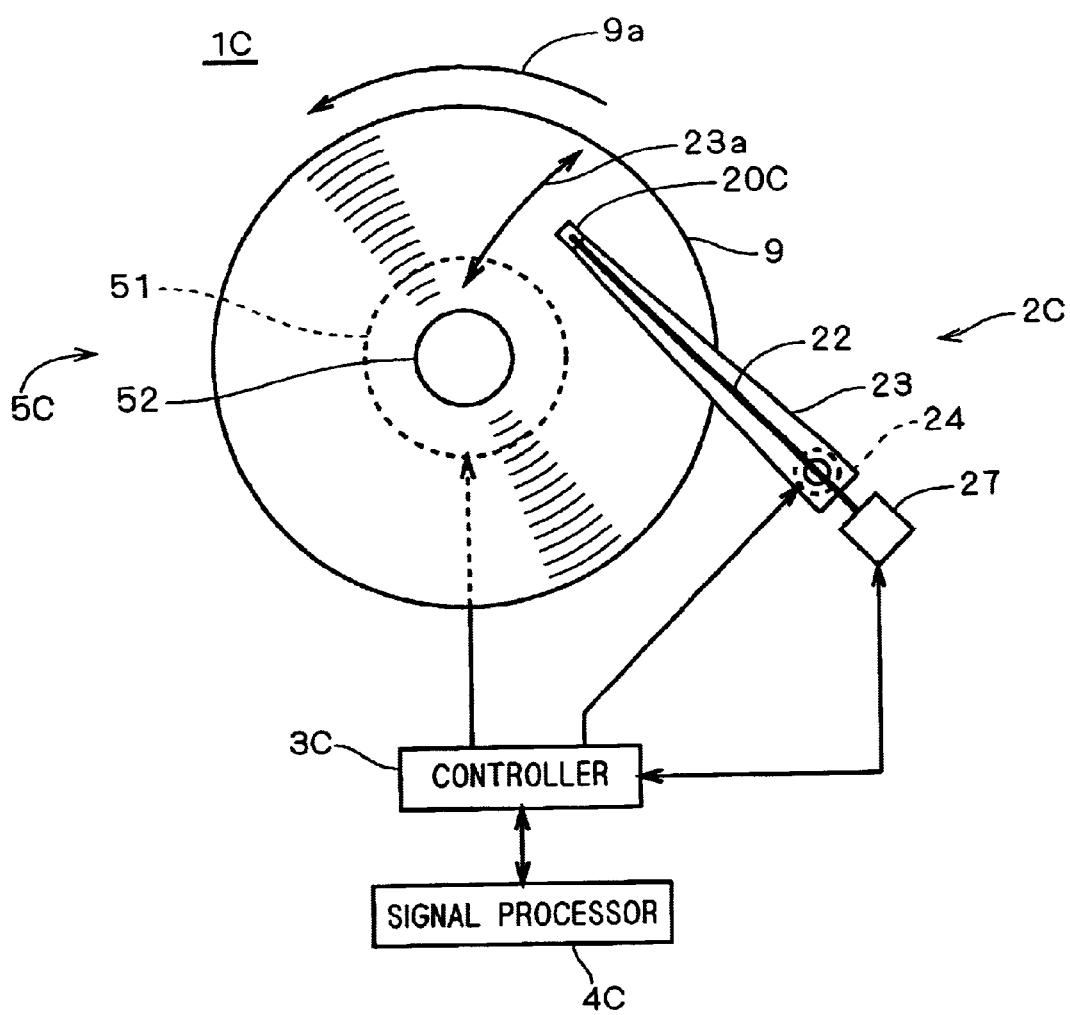
FIG. 30 is a schematic plan view showing a construction of a recording/reproducing apparatus.

FIG. 30 is a schematic plan view showing a construction of a recording/reproducing apparatus 1C according to an eighth preferred embodiment of the present invention. The recording/reproducing apparatus 1C comprises: a rotating mechanism 5C for rotating the recording medium 9 such as an optical disc in a predetermined direction as indicated by an arrow 9a while holding the recording medium 9 thereon; an optical head 2C for recording, reading (reproducing) and erasing signals on the recording surface of the recording medium 9; a controller 3C for providing a drive control signal to the optical head 2C and the rotating mechanism 5C; and a signal processor 4C for processing a recording signal (including an erase signal) for the recording medium 9 and a reproducing signal from the recording medium 9.

The rotating mechanism 5C comprises the rotation driver 51 including a motor, and the rotating shaft 52. Based on the drive control signal from the controller 3C, the rotation driver 51 rotates the rotating shaft 52 in the predetermined direction. The recording medium 9 is removable from the rotating shaft 52, and the recording medium 9 mounted to the rotating shaft 52 rotates integrally with the rotating shaft 52.

The optical head 2C comprises an optical unit 20C for recording, reproducing and erasing signals in proximity to the recording surface of the recording medium 9. The optical unit 20C is connected through an optical fiber 22 to a light source unit 27. The optical unit 20C is mounted to an arm 23 which is pivotable by an arm driver 24 in a substantially radial direction of the recording medium 9 as indicated by an arrow 23a under the control of the controller 3C.

Figure 31:
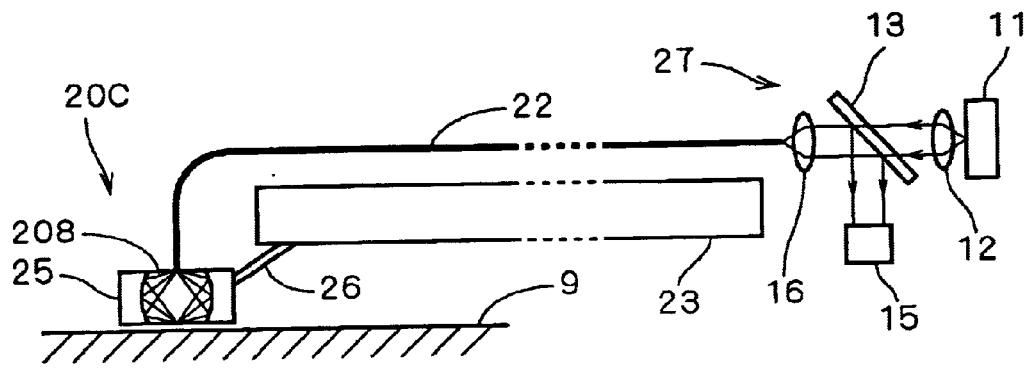
FIG. 31 schematically shows a construction of an optical unit and a light source unit.

FIG. 31 is a schematic view showing a construction of the optical unit 20C and the light source unit 27. The light source unit 27 comprises the light source 11, lenses 12 and 16 for directing light from the light source 11 into the optical fiber 22, the beam splitter 13 for reflecting light directed out of the optical unit 20C through the optical fiber 22, and a photodetector 15 for detecting the light reflected from the beam splitter 13. Preferably, the light source 11 is a compact light source such as a semiconductor laser. The light emission from the light source 11 is controlled by a drive circuit provided in the controller 3C.

The optical unit 20C has a structure such that a holder 25 holds in place a solid immersion mirror (SIM) 208 into which divergent light is directed from the optical fiber 22. The holder 25 is connected to the arm 23 through a suspension 26. In such a structure, when the SIM 208 is brought into proximity to the recording surface of the recording medium 9 being rotated, an air flow produced between the holder 25 and the recording surface creates a slight gap between the lower surface of the SIM 208 and the recording surface. That is, the optical head 2C remains in such a state that the lower surface of the SIM 208 is in proximity to the recording surface of the recording medium 9, based on the same principle as a so-called floating slider type magnetic head of a hard disc.

The light from the light source 11 is directed through an optical system including the lenses 12, 16 and the optical fiber 22 into the SIM 208. The light directed to the SIM 208 is reflected inside the SIM 208, and is then focused to a predetermined light focusing point on the lower surface of the SIM 208. The lower surface of the SIM 208 and the recording surface of the recording medium 9 are positioned very close to each other. This allows the recording, reproduction and erasure of information by the use of the light existing in the near-field region of a minute spot formed on the lower surface of the SIM 208. The SIM 208 is made principally of a high refractive index medium to be described later, and bringing the SIM 208 into proximity to the recording surface increases the numerical aperture near the light focusing point. This provides a very minute spot formed on the lower surface, to achieve high-density recording.

The reflected light from the recording medium 9 (including light diffused in the near-field region of the minute spot) is directed out of the SIM 208 to the optical fiber 22 and then enters the beam splitter 13. The light is reflected from the beam splitter 13 and enters the photodetector 15. Thus, the information recorded on the recording medium 9 is read by the photodetector 15.

Referring again to FIG. 30, the tip of the arm 23 is movable in the substantially radial direction of the disc-shaped recording medium 9. Under the control of the controller 3C, the tip of the arm 23 is moved by the arm driver 24 while the recording medium 9 is rotated. This allows the SIM 208 to access any region of the recording surface, with the light focusing point of the SIM 208 opposed to the recording surface. In other words, the arm 23, the arm driver 24 and the rotation driver 51 constitute a scanning mechanism for scanning the SIM 208 along the recording surface.

In accordance with the rotation of the recording medium 9 and the movement of the optical unit 20C, the signal processor 4C provides information to be recorded on the recording medium 9 through the controller 3C to the laser drive circuit, thereby to record (or erase) information on the recording medium 9. Further, the signal processor 4C processes a signal detected by the photodetector 15 through the controller 3C, thereby to read the information recorded on the recording medium 9. The read information is outputted, as required, to other information processing equipment.

A variety of techniques utilizing light may be used to record, reproduce and erase information on the recording medium 9 in the recording/reproducing apparatus 1C. One preferable technique usable herein is to change an optical characteristic of a photochromic material by the use of light with different wavelengths. In this technique, a recording layer made of a photochromic material is provided on the recording surface of the recording medium 9, and the light source 11 has a plurality of laser light emitting devices for generating light of wavelengths, e.g., for recording, reproduction and erasure. Light of wavelengths which change the optical characteristic of the photochromic material is used as the light of wavelengths for recording and erasure, and light of a wavelength which makes no change in the optical characteristic of the photochromic material is used as the light of the wavelength for reproduction.

The recording/reproducing apparatus 1C may record, erase and reproduce information by the use of light of only two wavelengths or may employ other principles which utilize light to record, erase and reproduce information. Alternatively, another apparatus may be used to record information whereas the apparatus shown in FIG. 30 is employed as a reproduction-only apparatus.

Additionally, the recording/reproducing apparatus 1C, which employs the SIM 208 utilizing light reflection, does not cause a difference in degree of light focusing resulting from a light wavelength difference, i.e. chromatic aberration, and can properly focus light of various wavelengths. Therefore, the recording/reproducing apparatus 1C may be an apparatus capable of utilizing other recording media (e.g., CD, DVD and recording media to be developed in the future).

Figure 32:
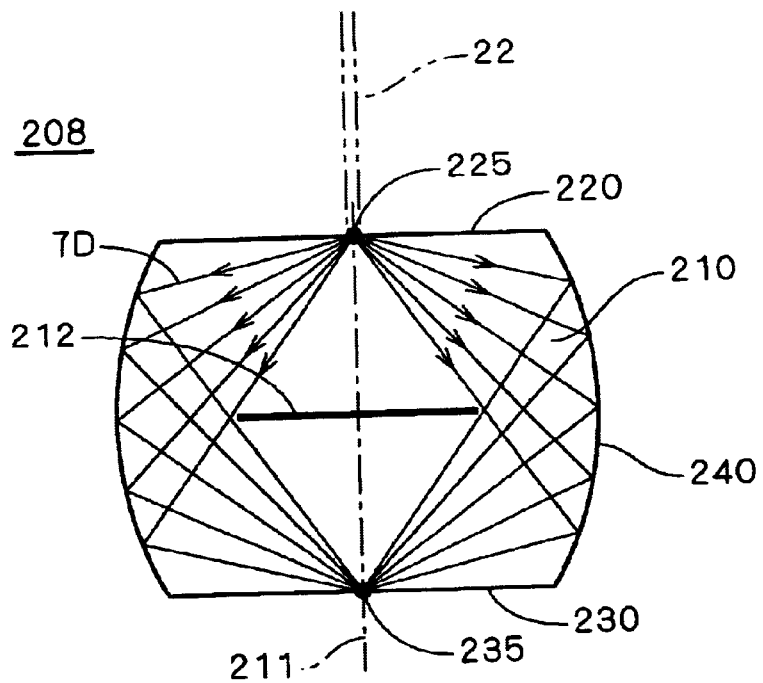
FIG. 32 is a vertical sectional view showing a structure of the SIM.

FIG. 32 is a vertical sectional view showing a structure of the SIM 208 to be provided in the optical unit 20C.

The SIM 208 is made principally of the light-permeable high-refractive-index medium 210, and has the upper surface 220 formed in an upper portion of the medium 210 and the lower surface 230 formed in a lower portion thereof. The side surface between the upper surface 220 and the lower surface 230 is a substantially tubular reflecting surface (referred to hereinafter as a "side reflecting surface") 240. The medium 210 has the shape of a solid of revolution about the axis 211. Light from the optical fiber 22 is directed from a light incident point 225 which is a minute region in the center of the upper surface 220 into the medium 210 in the form of divergent light 7D.

A light shielding plate 212 is provided in the center of the SIM 208 to prevent light from traveling directly from the light incident point 225 to the lower surface 230. Thus, the divergent light 7D is directed to the side reflecting surface 240, is reflected once from the side reflecting surface 240, and then is focused to a light focusing point 235 in the center of the lower surface 230. The light shielding plate 212 may be omitted if the direct travel of the light from the light incident point 225 to the lower surface 230 does not affect the recording and reproducing operations.

Figure 33:
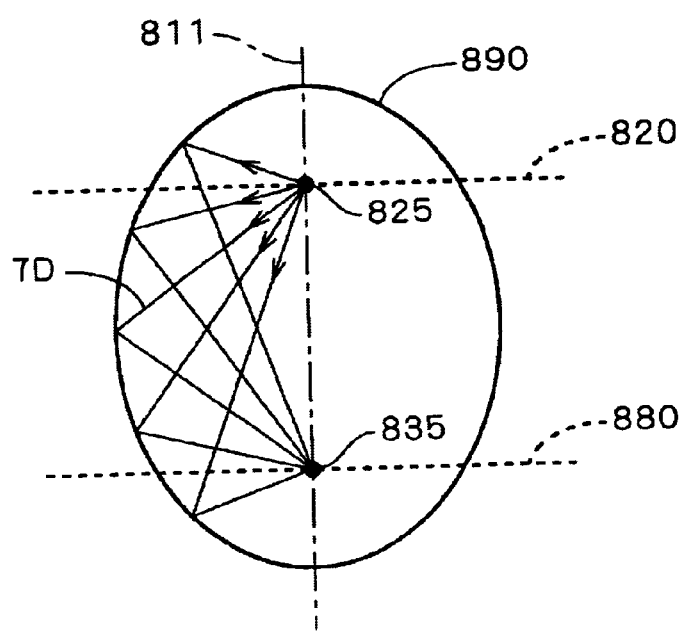
FIG. 33 is a view for illustrating a principle used when making a design determination of the shape of the side reflecting surface and the positions of a light incident point and the light focusing point in the SIM shown in FIG. 32.

FIG. 33 is a view for illustrating a principle used when making a design determination of the shape of the side reflecting surface 240 and the positions of the light incident point 225 and the light focusing point 235.

Assuming that the divergent light 7D is emitted from an upper focus 825 of an ellipse 890 and reflected from the ellipse 890, the reflected light is focused onto a lower focus 835 of the ellipse 890. Referring again to FIG. 32, part of a curved surface produced by rotating the ellipse 890 about a major axis 811 of the ellipse 890 shown in FIG. 33 (shown as a straight line including the major axis; and to be shown hereinafter in a similar manner) corresponds to the side reflecting surface 240. Part of a plane 820 passing through the focus 825 and perpendicular to the major axis 811 corresponds to the upper surface 220, and part of a plane 880 passing through the focus 835 and perpendicular to the major axis 811 corresponds to the lower surface 230. The position of the upper focus 825 corresponds to the position of the light incident point 225, and the position of the lower focus 835 corresponds to the position of the light focusing point 235.

By determining the shape of the side reflecting surface 240 and the positions of the light incident point 225 and the light focusing point 235 as described above, the divergent light 7D entering the medium 210 from the light incident point 225 is reflected once from the side reflecting surface 240 while propagating in the medium 210, and is then focused to the light focusing point 235. Therefore, bringing the recording surface of the recording medium 9 into proximity to the light focusing point 235 achieves information recording, reproduction and erasure utilizing near-field light.

For reproduction of recorded information, the light focused to the light focusing point 235 is scattered from the recording surface, and then enters the medium 210 from the light focusing point 235 in the form of divergent light. The divergent light is reflected from the side reflecting surface 240, and is then focused to the light incident point 225. Thereafter, the light is directed from the light incident point 225 through the optical fiber 22 and the beam splitter 13 to the photodetector 15, as shown in FIG. 31.

Since the SIM 208 is rotationally symmetric about the axis 211 serving as a center of rotation, light is incident on the light focusing point 235 uniformly from therearound to form a properly circular spot. Consequently, the recording/reproducing apparatus 1C can perform proper recording, reproducing and erasing operations.

In the SIM 208, the light is reflected only once from the side reflecting surface 240 before being focused. In other words, the SIM 208 can focus the light to the light focusing point 235 without reflecting the light from the lower surface 230 thereof. In case of damages to the lower surface 230 in a position other than the light focusing point 235, the focusing of light is not influenced by the damages.

Further, the SIM 208 in which the lower end of the side reflecting surface 240 laterally surrounds the light focusing point 235 allows the light to impinge on the light focusing point 235 at a large incident angle (with respect to the axis 211) (or provides a maximum incident angle of approximately 90°), thereby forming a spot using a light component providing a large numerical aperture near the light focusing point 235. This achieves the formation of a minute spot to improve the recording density of the recording medium 9.

On the other hand, an SIM having the lower surface 230 which is not flat may be easily designed since the lower surface 230 is not used as a reflecting surface. For example, an SIM produced with the lower surface 230 which is a near-flat conical surface with the light focusing point 235 at its vertex (or a conical surface with its vertex pointing downward) prevents contact between the recording surface of the recording medium 9 and the SIM if the SIM is slightly tilted. Only part of the lower surface 230 which has the possibility of contacting the recording medium 9 may be formed as an inclined surface.

Figure 34:
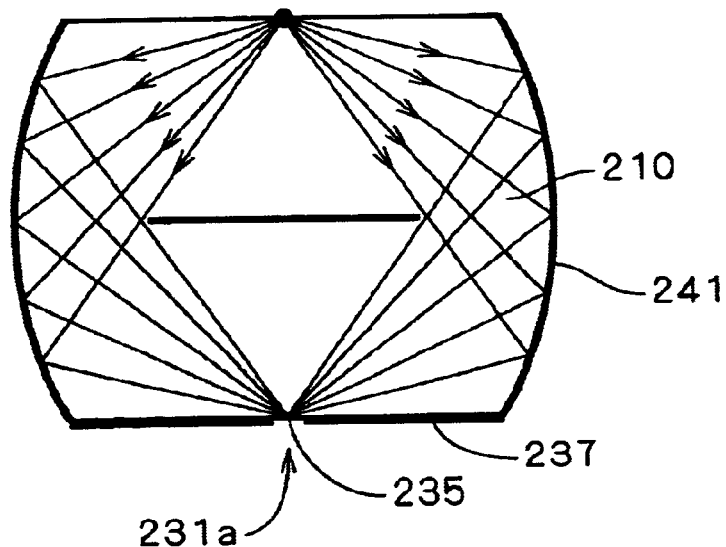
FIG. 34 is a vertical sectional view illustrating the SIM of FIG. 32 with various types of coating applied thereto.

FIG. 34 illustrates an SIM 208a produced by applying various types of coating to the SIM 208 shown in FIG. 32.

The SIM 208a has the reflective coat 241 formed on the side surface thereof. A mask 237 is formed on the lower surface of the SIM 208a to prevent light from leaking outwardly from other than the light focusing point 235. These coats (including the mask) are formed, for example, as metal films.

The reflective coat 241 on the side surface is formed to ensure that the side surface acts as the reflecting surface even if the side surface does not satisfy a total reflection requirement for the light entering the medium 210, and also prevents unwanted light from entering the medium 210 from the outside.

The mask 237 on the lower surface is formed to prevent unwanted light from being released from the lower surface onto the recording medium 9. The minute opening 231a is formed at the light focusing point 235. Preferably, the minute opening 231a is not greater than approximately 1 $\mu$m in diameter (or a dimension regarded substantially as a diameter). Further, when only the light in the near-field region of the light focusing point 235 is directed outwardly from the minute opening 231a for use in recording, reproduction and erasure, the diameter of the minute opening 231a preferably is not greater than the wavelength of light.

The mask 237 on the medium surface near the light focusing point 235 may be formed integrally with the reflective coat 241. Only any one of the reflective coat 241 and the mask 237 may be selectively formed. The reflective coat and the mask may be formed, as required, on other SIMs to be described later.

<10. Ninth Preferred Embodiment>

Figure 35:
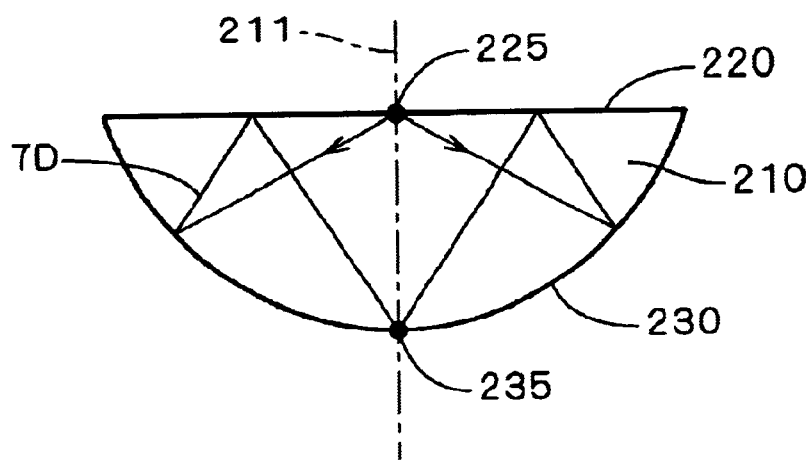
FIG. 35 is a vertical sectional view showing a structure of the SIM.

Another form of the SIM for use in the recording/reproducing apparatus 1C will be described according to a ninth preferred embodiment of the present invention. FIG. 35 is a vertical sectional view showing an SIM 208b according to the ninth preferred embodiment.

The SIM 208b is made principally of the light-permeable high-refractive-index medium 210, and has the shape of a solid of revolution about the axis 211. The upper surface 220 is a flat surface, and the lower surface 230 is a downwardly protruding convex surface. Light from the optical fiber 22 (not shown) is directed from the light incident point 225 in the center of the upper surface 220 into the medium 210 in the form of the divergent light 7D. The divergent light 7D is reflected from the lower surface 230, and then impinges on the upper surface 220 while being focused. Thereafter, the light is reflected again from the upper surface 220, and is then focused to the light focusing point 235.

Figure 36:
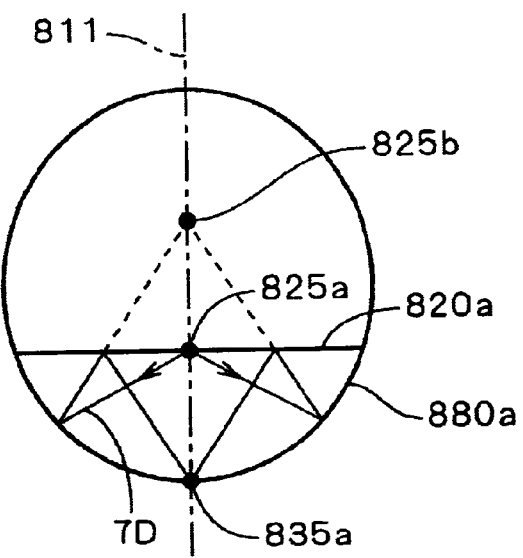
FIG. 36 is a view for illustrating a principle used when making a design determination of the shapes and arrangement of upper and lower surfaces and the positions of the light incident point and the light focusing point in the SIM shown in FIG. 35.

FIG. 36 is a view for illustrating a principle used when making a design determination of the shapes and arrangement of the upper and lower surfaces 220 and 230 and the positions of the light incident point 225 and the light focusing point 235.

Assuming that the divergent light 7D is emitted from a lower focus 825a of an ellipse 880a and reflected from the ellipse 880a, the reflected light is focused onto an upper focus 825b of the ellipse 880a. A plane 820a is defined which passes through the focus 825a and is perpendicular to the major axis 811, and is assumed to reflect light. Then, when the length of the major axis of the ellipse 880a (or the distance between the two points of intersection of the major axis 811 and the ellipse 880a) is three times greater than the distance between the two foci 825a and 825b, the focus 825b and a lower end point 835a (the lower point of intersection of the major axis 811 and the ellipse 880a) are in symmetric relationship with respect to the plane 820a.

Therefore, the light emitted from the focus 825a and reflected from the ellipse 880a and the plane 820a is focused to the point 835a. Referring again to FIG. 35, a lower part of a curved surface produced by rotating the ellipse 880a about the vertical major axis 811 of FIG. 36 corresponds to the lower surface 230, and part of the plane 820a passing through the focus 825 and perpendicular to the major axis 811 corresponds to the upper surface 220. The position of the lower focus 825a corresponds to the position of the light incident point 225, and the position of the point 835a corresponds to the position of the light focusing point 235.

By determining the shapes and arrangement of the upper and lower surfaces 220 and 230 and the positions of the light incident point 225 and the light focusing point 235 as described above, the divergent light 7D entering the medium 210 from the light incident point 225 is reflected sequentially from the lower surface 230 and the upper surface 220 while propagating in the medium 210, and is then focused to the light focusing point 235. Therefore, bringing the recording surface of the recording medium 9 into proximity to the light focusing point 235 achieves information recording, reproduction and erasure utilizing near-field light.

For reproduction of recorded information, the light focused to the light focusing point 235 is scattered from the recording surface, and then enters the medium 210 from the light focusing point 235 in the form of divergent light. The light travels along the reverse path, and is then focused to the light incident point 225. Thereafter, the light is directed from the light incident point 225 through the optical fiber 22 and the beam splitter 13 to the photodetector 15.

Since the SIM 208b is rotationally symmetric about the axis 211 serving as a center of rotation, light is incident on the light focusing point 235 uniformly from therearound to form a properly circular spot.

Additionally, the SIM 208b which has the downwardly convex lower surface 230 prevents contact between the lower surface 230 and the recording medium 9 if the SIM 208b is tilted. This prevents damages to the reflecting surface.

When forming a reflective coat on the lower surface 230 of the SIM 208b, a coat serving both as the reflective coat and as a mask near the light focusing point 235 may be formed.

<11. Tenth Preferred Embodiment>

Figure 37:
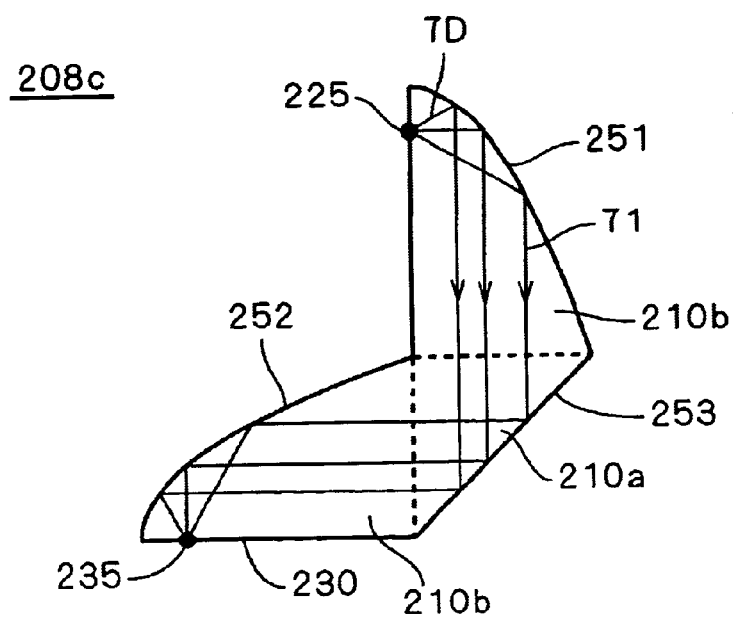
FIG. 37 is a vertical sectional view showing a structure of the SIM.

Still another form of the SIM for use in the recording/reproducing apparatus 1C will be described according to a tenth preferred embodiment of the present invention. FIG. 37 is a vertical sectional view showing an SIM 208c according to the tenth preferred embodiment.

The SIM 208c is made principally of a light-permeable high-refractive-index medium which has a portion designated by the reference character 210a of FIG. 37, and two protruding portions designated by the reference character 210b. The portion designated by the reference character 210a has a shape obtained by cutting a cube along a plane including a pair of opposed edges (or the shape of a prism with a base having the shape of a rectangular equilateral triangle). Each of the protruding portions designated by the reference character 210b has a shape obtained by cutting a solid produced by rotating a parabola about a symmetry axis along a plane including the symmetry axis.

Figure 38:
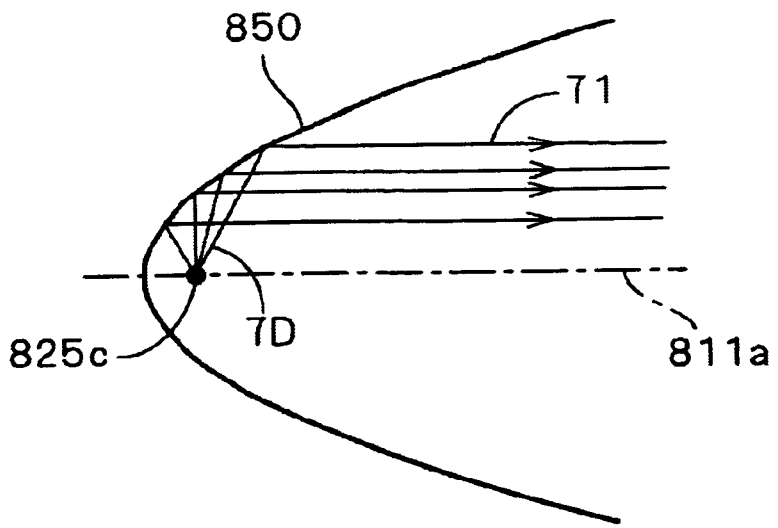
FIGS. 38 and 39 are views for illustrating a principle used when making a design determination of the shape of the SIM shown in FIG. 37 and the positions of the light incident point and the light focusing point.
Figure 39:
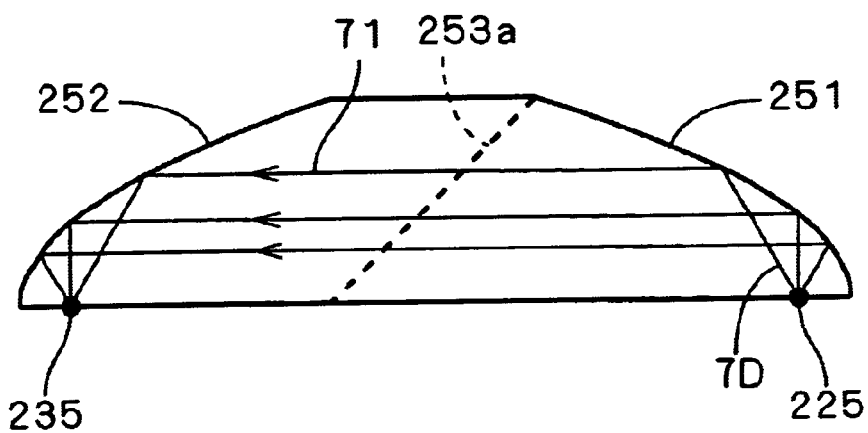

FIGS. 38 and 39 are views for illustrating a principle used when making a design determination of the shape of the SIM 208c and the positions of the light incident point 225 and the light focusing point 235.

With reference to FIG. 38, assuming that the divergent light 7D is emitted from the focus 825c of a parabola 850 and reflected from the parabola 850, the reflected light becomes collimated light 71. Conversely, when collimated light parallel to a symmetry axis 811a is incident on the parabola 850, the light is focused onto the focus 825c.

It is assumed that a curved surface is defined which is produced by rotating the parabola 850 about the symmetry axis 801a. This curved surface may be used both as a reflecting surface for converting divergent light from the focus into collimated light and as a reflecting surface for focusing collimated light onto the focus.

FIG. 39 shows an SIM with the medium surface including curved surfaces 251 and 252 produced by rotating two parabolas protruding in opposite directions about a common symmetry axis. Part of the SIM below the symmetry axis is removed. With reference to FIG. 39, the divergent light 7D entering the medium from the light incident point 225 positioned at the focus of the curved surface 251 is reflected from the curved surface 251, thereby to be converted into the collimated light 71. The collimated light 71 is reflected from the curved surface 252 and then focused to the light focusing point 235 positioned at the focus of the curved surface 252. This attains the SIM which focuses the divergent light 7D entering the medium from the light incident point 225 to the light focusing point 235.

The SIM shown in FIG. 39 in which the light incident point 225 and the light focusing point 235 are present on the same lower surface is not preferable in shape for use in the recording/reproducing apparatus 1C. Folding the direction of travel of light using a plane 253a (perpendicular to the plane of the figure) in the SIM of FIG. 39 produces the SIM 208c shown in FIG. 37.

More specifically, each of the curved surfaces 251 and 252 serving as the reflecting surfaces in FIG. 37 is part of a curved surface produced by rotating a parabola about a symmetry axis, and the light incident point 225 and the light focusing point 235 are positioned at the foci of the curved surfaces 251 and 252, respectively. The divergent light 7D entering the medium from the light incident point 225 is converted by the curved surface 251 into the collimated light 71. Thereafter, the collimated light 71 is reflected from a reflecting surface 253 to change the direction of travel, and is then focused by the curved surface 252 to the light focusing point 235.

When a curved surface produced by rotating a parabola about a symmetry axis is used to convert divergent light (light diverging at a uniform intensity in any direction) into collimated light, a sectional intensity distribution of the collimated light taken along a plane perpendicular to the symmetry axis is not uniform. However, the SIM 208c employs the curved surfaces 251 and 252 of the same shape, and the light reflected along a predetermined path of reflection from the curved surface 251 travels in the reverse direction of the corresponding path of reflection from the curved surface 252 and then is reflected from the curved surface 252. Thus, the light conversion made by the curved surface 251 and the light conversion made by the curved surface 252 are in exactly inverse relation to each other.

Therefore, when the light divergent at a uniform intensity in various directions is converted by the curved surface 251 into the collimated light which in turn is converted by the curved surface 252 into convergent light, the convergent light is incident on the light focusing point 235 at a uniform intensity from various directions to form a proper light spot at the light focusing point 235. The curved surfaces 251 and 252 are required to have the same shape only in their regions which effectively reflect light.

Further, in the SIM 208c, the lower surface 230 including the light focusing point 235 is not used as a reflecting surface. In case of damages to the lower surface 230 in a position other than the light focusing point 235, the focusing of light is not influenced by the damages.

Although the portion of the SIM 208c which is designated by the reference character 210a is illustrated as having the shape obtained by cutting a cube in half, the shape of this portion may be changed as required insofar as this portion can direct the light from the curved surface 251 to the curved surface 252. A reflective coat may be formed as required on the curved surfaces 251, 252 and the reflecting surface 253. Further, the surfaces on which the light incident point 225 and the light focusing point 235 are present respectively need not be flat.

<12. Other Forms of SIM>

Although the SIM 208c according to the tenth preferred embodiment employs the reflecting surfaces for conversion between the diverging or converging light and the collimated light, surfaces of various shapes other than that shown in FIG. 37 may be used as such reflecting surfaces.

The medium 210 shown in FIG. 40 has a side surface which is a curved surface 266 produced by rotating a parabola about the axis 211 as a symmetry axis, and a central point 267 of a lower surface 263 thereof is positioned at the focus of the parabola. The curved surface 266, when used as a reflecting surface, can convert the divergent light from the point 267 into the collimated light 71, and conversely focus to the point 267 the collimated light 71 parallel to the axis 211 which is incident on the curved surface 266.

Figure 41:
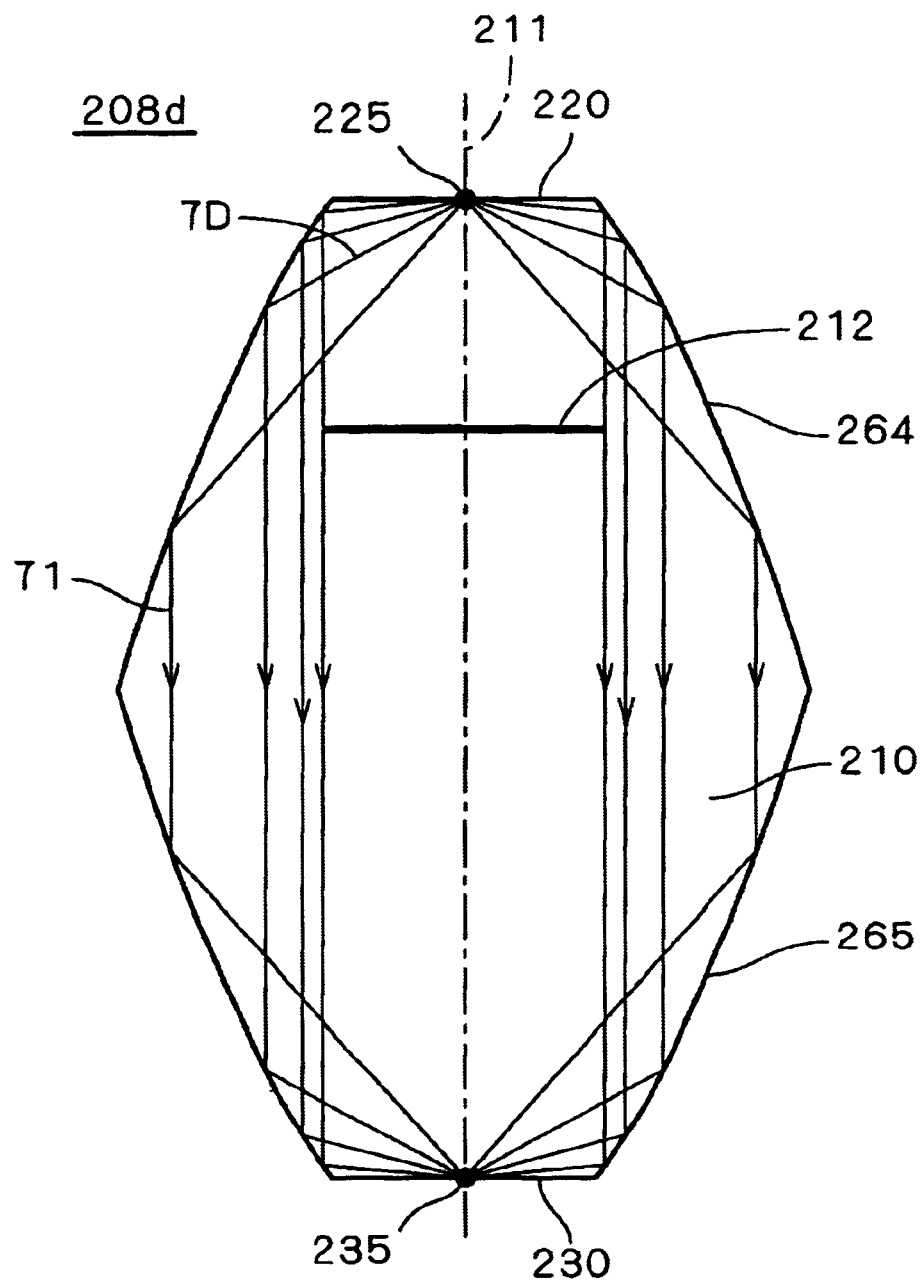
FIG. 41 is a vertical sectional view showing a structure of the SIM.

FIG. 41 is a vertical sectional view of an SIM 208d provided with two vertically arranged curved surfaces 266 each shown in FIG. 40 for focusing the divergent light entering the medium 210 from the light incident point 225 on the upper surface 220 to the light focusing point 235 on the lower surface 230. The SIM 208d has a curved surface 264 which is part of a curved surface produced by rotating a first parabola about the axis 211 serving as the symmetry axis, and the light incident point 225 is positioned at the focus of the first parabola. The SIM 208d further has a curved surface 265 which is also part of a curved surface produced by rotating a second parabola (with a symmetry axis corresponding to the axis 211) about the axis 211, and the light focusing point 235 is positioned at the focus of the second parabola. Thus, the divergent light 7D entering the medium 210 from the light incident point 225 is converted by the curved surface 264 into the collimated light 71. The collimated light 71 travels along the axis 211, is reflected from the curved surface 265, and is then focused to the light focusing point 235.

The light shielding plate 212 is provided, as required, in the medium 210 to prevent divergent light from traveling directly to the light focusing point 235.

Since the SIM 208d is rotationally symmetric about the axis 211 serving as a center of rotation, light is incident on the light focusing point 235 uniformly from therearound to form a properly circular spot. Further, the lower surface 230 of the SIM 208d is not used as a reflecting surface. In case of damages to the lower surface 230 in a position other than the light focusing point 235, the focusing of light is not influenced by the damages.

Additionally, the SIM 208d allows the light to impinge on the light focusing point 235 at a large incident angle (with respect to the axis 211), thereby forming a spot using a light component providing a large numerical aperture near the light focusing point 235. This achieves the formation of a minute spot to improve the recording density of the recording medium 9.

Figure 42:
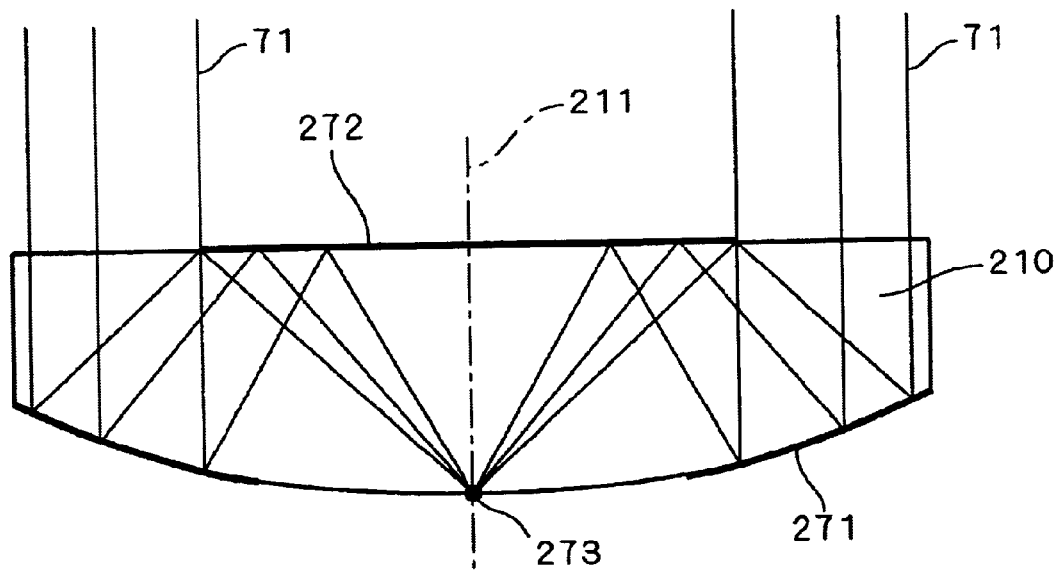
FIG. 42 shows another example of the reflecting surface for conversion between diverging or converging light and collimated light.

FIG. 42 shows another example of the reflecting surface for conversion between the diverging or converging light and the collimated light. With reference to FIG. 42, the reflecting surface for light conversion comprises a reflecting surface element 271 and a reflecting surface element 272. The reflecting surface element 271 is annular about the axis 211, and the reflecting surface element 272 is circular about the axis 211.

Figure 43:
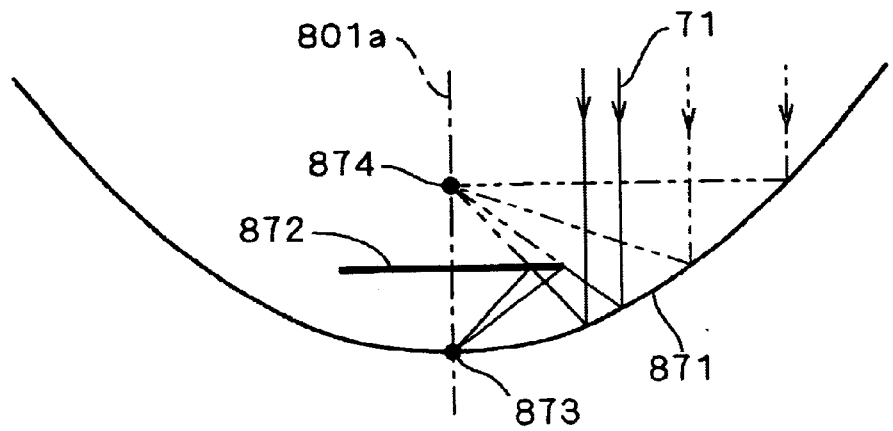
FIG. 43 is a view for illustrating a relationship between two reflecting surface elements shown in FIG. 42.

FIG. 43 is a view for illustrating the relationship between the reflecting surface elements 271 and 272. With reference to FIG. 43, assuming that the collimated light 71 parallel to the symmetry axis 801a is reflected from a parabola 871, the reflected light is focused onto the focus 874 of the parabola 871. A line 872 is drawn which is a perpendicular bisector of a line segment connecting the vertex 873 and the focus 874 of the parabola 871. Assuming that light is reflected from the line 872, the reflected light is focused onto the vertex 873.

Referring again to FIG. 42, the reflecting surface element 271 is part of a curved surface produced by rotating the parabola 871 about the symmetry axis 801a, and the reflecting surface element 272 is part of a flat surface produced by rotating the line 872 about the symmetry axis 801a. A point 273 on the boundary of the medium 210 is provided at a position corresponding to the vertex 873 (substantially in the center of the reflecting surface element 271). Thus, the collimated light 71 incident on the reflecting surface element 271 along the axis 211 is reflected sequentially from the reflecting surface elements 271 and 272, and is then focused to the point 273. Conversely, the divergent light from the point 273 is reflected sequentially from the reflecting surface elements 272 and 271, thereby to be converted into the collimated light 71.

If the refractive index of the medium 210 and the incident angle on the reflecting surface elements satisfy the total reflection requirement, it is not necessary to provide the reflecting surface elements 271 and 272 as the reflective coat, but the surface of the medium 210 itself may be used as a reflecting surface element.

FIG. 44 is a vertical sectional view of an SIM 208e provided with two vertically arranged reflecting surface element groups each shown in FIG. 42. The SIM 208e has reflecting surface elements 275 and 276 corresponding to the reflecting surface element 271 of FIG. 42, and reflecting surface elements 274 and 277 corresponding to the reflecting surface element 272 of FIG. 42. The light incident point 225 and the light focusing point 235 correspond to the point 273 of FIG. 42. In other words, the reflecting surface element 275 is an annular reflecting surface opposed to the reflecting surface element 274, and the light incident point 225 is positioned substantially in the center of the reflecting surface element 275. The reflecting surface element 276 is an annular reflecting surface opposed to the reflecting surface element 277, and the light focusing point 235 is positioned substantially in the center of the reflecting surface element 276.

The reflecting surface elements 274 and 275 constitute a reflecting surface for sequentially reflecting the divergent light entering the medium 210 from the light incident point 225 to convert the light into the collimated light 71, and the reflecting surface elements 276 and 277 constitute a reflecting surface for sequentially reflecting the collimated light 71 to focus the light to the light focusing point 235. The reflecting surface elements 274 and 277 are opposite surfaces of a single plate-like reflecting member (a thin film made of metal or the like).

Since the SIM 208e is rotationally symmetric about the axis 211 serving as a center of rotation, light is incident on the light focusing point 235 uniformly from therearound to form a properly circular spot. Additionally, the SIM 208e which has the downwardly convex lower surface can prevent contact between the SIM 208e and the recording medium 9 if the SIM 208e is tilted.

FIG. 45 is a vertical sectional view of an SIM 208f obtained by combining together a portion of the SIM 208e of FIG. 44 which includes the light incident point 225 and a portion of the SIM 208d of FIG. 41 which includes the light focusing point 235. Also in the SIM 208f, the divergent light from the light incident point 225 is reflected from the reflecting surface elements 274 and 275 while propagating in the medium 210, and is thereby converted into the collimated light 71 parallel to the axis 211. Then, the light is focused to the light focusing point 235 by the curved surface 265.

The characteristic of the light to be focused to the light focusing point 235 may be changed as required by causing a relationship between the characteristic of the reflecting surface for converting the divergent light into the collimated light 71 and the characteristic of the reflecting surface for converting the collimated light 71 into the convergent light to differ from a merely inversely converting relationship, that is, by providing different shapes of these reflecting surfaces (including the reflecting surface element group), as in the SIM 208f.

For instance, the SIM 208f may be adapted such that a maximum incident angle (with respect to the axis 211) at which light is incident on the light focusing point 235 is greater than a maximum outgoing angle (with respect to the axis 211) of the divergent light from the light incident point 225. Thus, the SIM 208f can form a spot using a light component providing a large numerical aperture near the light focusing point 235 even if the degree of divergence of the incident divergent light is small. This achieves the formation of a minute spot to improve the recording density of the recording medium 9.

The technique for making different from each other the reflecting surface for converting the divergent light into the collimated light and the reflecting surface for converting the collimated light into the convergent light as in the SIM 208f may be used for the SIM 208c shown in FIG. 37, the SIM 208d shown in FIG. 41, and the SIM 208e shown in FIG. 44. Specifically, each of these SIMs is designed to comprise two curved surfaces each produced by rotating a parabola about a symmetry axis. Making the parabolas for use in designing these curved surfaces different in size from each other provides different shapes between the curved surface containing the light incident point 225 and the curved surface containing the light focusing point 235, thereby allowing changes in light focusing characteristic at the light focusing point 235 as required. Changes in light focusing characteristic are attained if the two reflecting surfaces are identical in entire shape but have respectively differently shaped regions for actually effectively reflecting light.

<13. Method of Manufacturing SIMs>

Description will now be given on a method of manufacturing the SIMs 208, and 208b to 208f described above.

Figure 46:
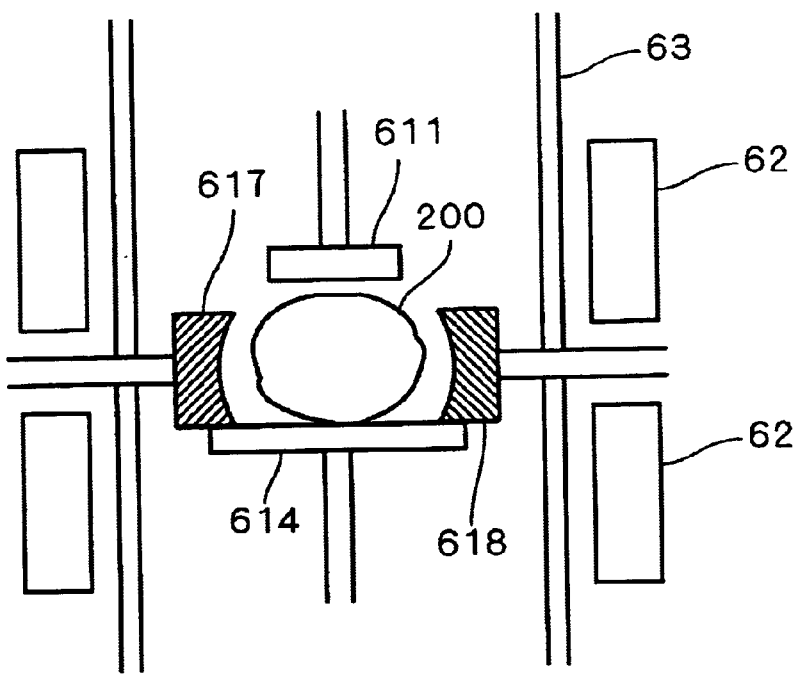
FIG. 46 shows the SIM of FIG. 32 being manufactured by a glass molding process.

FIG. 46 shows the glass material 200 (or a glass gob) which is titanium silica glass being pressed for manufacture of the SIM 208 shown in FIG. 32 by a glass molding process. The glass material 200 is pressed in an atmosphere of nitrogen gas within a quartz tube 63 using the top mold 611, a pair of side molds 617, 618 and a bottom mold 614 while being heated by the heating mechanism 62. The side molds 617 and 618 have curved surfaces produced by rotating an ellipse about the major axis thereof.

Figure 47:
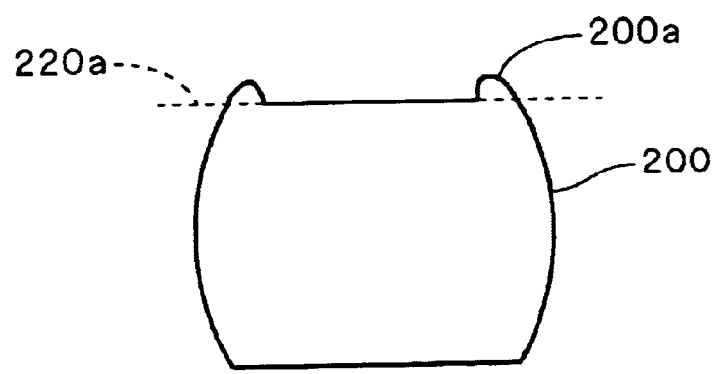
FIG. 47 shows a glass material after being pressed.

The top mold 611 is sized to create a clearance between the top mold 611 and each of the side molds 617, 618 during pressing, and unwanted portions 200a remain in an upper portion of the glass material 200 after being pressed, as shown in FIG. 47. Then, the unwanted portions 200a are removed by polishing to the position of a surface 220a corresponding to the upper surface, and the manufacture of the SIM 208 is completed. If required, the coats illustrated in FIG. 34 are formed.

The SIM 208b shown in FIG. 35 which is similar in shape to a convex-plano lens is formed by a conventional glass molding process. As required, a coat is formed on the reflecting surface.

Figure 48:
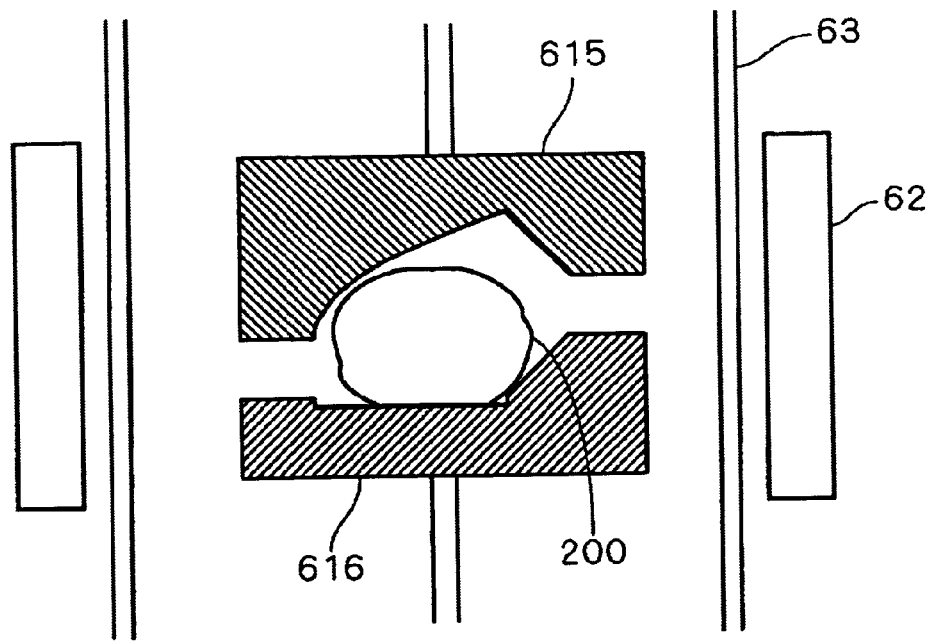
FIG. 48 shows the SIM of FIG. 37 being manufactured by the glass molding process.
Figure 49:
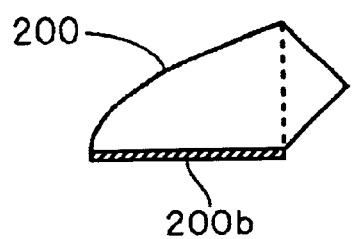
FIG. 49 shows a glass material after being pressed.

FIG. 48 shows pressing for manufacture of the SIM 208c shown in FIG. 37. In FIG. 48, the glass material 200 is also pressed in an atmosphere of nitrogen gas within the quartz tube 63 using a top mold 615 and a bottom mold 616 while being heated by the heating mechanism 62. The glass material 200 is pressed into the shape shown in FIG. 49 by a glass molding process, and a lower portion 200b is polished to form a surface including a point corresponding to the focus of the parabola. The above-mentioned process produces a half portion of the SIM 208c. As required, a reflective coat is formed.

Figure 50:
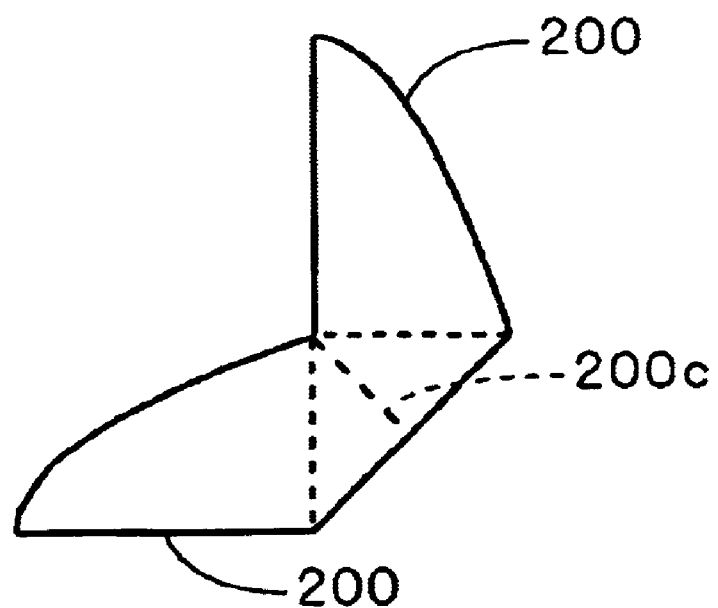
FIG. 50 shows glass materials being bonded together after being pressed.

Thereafter, as shown in FIG. 50, the two pressed glass materials 200 are bonded together at a surface 200c using an optically matched adhesive or the like, and the manufacture of the SIM 208c is completed. The SIM 208c need not always be produced from two portions of the same shape.

The SIMs 208d, 208e and 208f shown in FIGS. 41, 44 and 45 are manufactured by individually forming the upper and lower parts thereof by a glass molding process. Thereafter, a reflective coat is formed, as required, and the upper and lower parts are bonded together using an optically matched adhesive or the like. The SIMs 208d, 208e and 208f may be adapted such that a surface of separation between the upper and lower parts is perpendicular to the direction of travel of the collimated light 71, in which case it is not necessary to provide optical matching for bonding. Further, the upper and lower parts need not be bonded together.

<14. Other Modifications>

The preferred embodiments according to the present invention have been described hereinabove. The present invention, however, is not limited to the above-mentioned preferred embodiments, but various modifications may be made thereto.

For instance, when the surface of the medium 210 itself is used as the reflecting surface in the SIMs of the above-mentioned preferred embodiments, the higher the refractive index of the medium 210 is, the more reliably reflection is achieved. In general, the refractive index is preferably not less than 1.5. Such a refractive index of not less than 1.5 is readily obtained by the use of glass as the medium 210. Other materials such as crystal may be used as the medium 210.

The medium 210 need not have well-defined portions corresponding to the upper and lower surfaces. Specifically, in the SIM 208 or the SIM 208b, the light incident point 225 is required only to be present on a boundary in an upper part of the medium 210, and the light focusing point 235 is required only to be present on a boundary in a lower part of the medium 210.

In the above-mentioned preferred embodiments, the reflecting surface may be formed inside the medium 210 without using the surface of the medium 210 as the reflecting surface.

In the SIM 208 shown in FIG. 32, the side reflecting surface 240 is required only to be a substantially tubular reflecting surface extending from the upper part to the lower part of the medium 210. It is not necessary that the upper and lower surfaces 220 and 230 are in contact with the side reflecting surface 240. Moreover, the side reflecting surface 240 need not be completely tubular but may be substantially tubular in shape. For example, a plurality of ring-shaped reflecting surfaces arranged vertically may be used as the side reflecting surface 240 or a plurality of vertically extending reflecting surfaces arranged around the axis 211 may be used as the side reflecting surface 240.

In the SIM 208b shown in FIG. 35, the upper and lower surfaces 220 and 230 used as the reflecting surface may have the shapes of other surfaces than a flat surface and a curved surface produced by rotating an ellipse. If other curved surfaces are used, a downwardly protruding convex shape of the lower surface 230 can prevent contact between the lower surface 230 and the recording medium 9 which results from tilting of the SIM. In place of the lower surface 230, a downwardly protruding convex reflecting surface may be formed in the medium. Such a structure can provide a convex lower surface and achieve the nonuse of the lower surface as the reflecting surface, thereby to prevent contact between the lower surface and the recording medium 9 which results from tilting of the SIM or to prevent damages to the reflecting surface.

The SIMs shown in FIGS. 37, 41, 44 and 45, in which the divergent light is converted into the collimated light which in turn is focused, can change the distance of propagation of the collimated light in the medium, as required. This increases the flexibility in determining the positional relationship between the light incident point 225 and the light focusing point 235.

As in the SIM 208c shown in FIG. 37, the provision of an intermediate reflecting surface for changing the direction of travel of the collimated light between the reflecting surface for converting the divergent light into the collimated light and the reflecting surface for converging the collimated light can achieve further increase in flexibility in determining the positional relationship between the light incident point 225 and the light focusing point 235. The number of intermediate reflecting surfaces for reflecting the collimated light is not limited to one but may be two or more. Further, the incident angle of the light on the intermediate reflecting surface may be changed freely. The SIMs shown in FIGS. 41, 44 and 45 may be provided with the intermediate reflecting surface.

With reference to FIG. 42, the shapes of the reflecting surface elements 271 and 272 are not limited to those described above. For instance, the reflecting surface element 272 may be a downwardly protruding conical surface, and the shape of the reflecting surface element 271 may be determined as required in accordance with the shape of the reflecting surface element 272. Conversely, the reflecting surface element 271 may be a downwardly protruding conical surface, and the shape of the reflecting surface element 272 may be determined as required in accordance with the shape of the reflecting surface element 271.

Although the divergent light is directed from the optical fiber 22 into the SIM in the above description, a scattering member may be provided between the optical fiber 22 and the light incident point 225 of the SIM. Alternatively, other techniques for directing the divergent light into the SIM may be used without using the optical fiber 22. For example, a light source may be directly mounted on the light incident point 225, in which case the recording/reproducing apparatus 1C has a compact optical structure.

The optical head 2C of the recording/reproducing apparatus 1C may have other structures than that shown in FIGS. 30 and 31. For example, the arm 23 may be disposed in a direction from the center of rotation of the recording medium 9 to the outer periphery thereof and make a linearly sliding movement in this direction. The optical unit 20C may be fixed to the arm 23 directly, rather than through the suspension.

In the above-mentioned preferred embodiments, the light from the recording surface of the recording medium 9 of the recording/reproducing apparatus 1C is illustrated as directed through the SIM into the photodetector 15. Instead, a photodetector may be provided outside the optical head 2C to detect released light resulting from scattering of near-field light near the light focusing point 235 from the recording surface without passing through the SIM.

The SIMs described above may be employed in other than the apparatus for recording, reproducing or erasing information on the recording medium 9. For example, the SIMs may be employed in a master exposure apparatus for producing a master optical disc or a microscope for observation of samples.

Although the configurations of the SIM have been described using the light propagating in the medium 210 when the divergent light 7D is directed from the light incident point 225 of the SIM into the medium 210, it is not always necessary that the light is directed from the light incident point 225 when the SIM is used. For example, when the SIM is used for a near-field optical microscope for observation of a light-permeable sample in a transparent mode, illumination is provided in a direction opposite from the direction of observation, and near-field light near the surface of the sample is obtained at the light focusing point 235 and directed outwardly at the light incident point 225. Thus, the terms "light incident point 225" and "light focusing point 235" are used herein for purposes of merely illustrating the configurations of the SIM.

While the invention has been described in detail, the foregoing description is in all aspects illustrative and not restrictive. It is understood that numerous other modifications and variations can be devised without departing from the scope of the invention.

What is claimed is:

1. A solid immersion mirror device made principally of a light-permeable medium having a refractive index of greater than 1, said solid immersion mirror device comprising:

a first reflecting surface which is part of a curved surface produced by rotating a parabola about a symmetry axis thereof; and a second reflecting surface which is part of a plane perpendicular to a line segment connecting the focus of said parabola and the vertex of said parabola, wherein collimated light entering said medium from the second reflecting surface side along said symmetry axis is reflected sequentially from said first and second reflecting surfaces while propagating in said medium, and is then focused to a light focusing point on a boundary of said medium.

2. The solid immersion mirror device according to claim 1, wherein a surface of said medium on which said light is incident is a flat surface perpendicular to an incident direction of said light.

3. The solid immersion mirror device according to claim 1, wherein a surface of said medium is provided with a mask near said light focusing point, and said mask has a minute opening formed at said light focusing point.

4. A solid immersion mirror device made principally of a light-permeable medium having a refractive index of greater than 1, said solid immersion mirror device comprising:

a first reflecting surface which is part of a curved surface produced by rotating part of a parabola lying on the opposite side of a rotational axis from the vertex of said parabola about said rotational axis, said rotational axis being parallel to the symmetry axis of said parabola and intersecting said parabola at a position spaced apart from said vertex of said parabola; and a second reflecting surface which is part of a conical surface produced by rotating part of a line lying on the opposite side of said rotational axis from said vertex, said line being perpendicular to a line segment connecting the focus of said parabola and a point of intersection of said parabola and said rotational axis within a plane including said parabola, wherein collimated light entering said medium from the second reflecting surface side along said rotational axis is reflected sequentially from said first and second reflecting surfaces while propagating in said medium, and is then focused to a light focusing point on a boundary of said medium.

5. The solid immersion mirror device according to claim 4, wherein said rotational axis and said second reflecting surface intersect each other, and part of light reflected from said first reflecting surface is reflected from near a point of intersection of said rotational axis and said second reflecting surface.

6. The solid immersion mirror device according to claim 4, wherein a surface of said medium on which said light is incident is a flat surface perpendicular to an incident direction of said light.

7. The solid immersion mirror device according to claim 4, wherein a surface of said medium is provided with a mask near said light focusing point, and said mask has a minute opening formed at said light focusing point.

8. The solid immersion mirror device according to claim 7, wherein said minute opening has a diameter not greater than a wavelength of said light.

9. A solid immersion mirror device made principally of a light-permeable medium having a refractive index of greater than 1, said solid immersion mirror device comprising:
   a first reflecting surface of a substantially annular shape and provided in a lower portion of said medium; and
   a second reflecting surface provided in an upper portion of said medium,
   wherein light entering said medium in a predetermined direction from said upper portion to said lower portion is reflected sequentially from said first and second reflecting surfaces while propagating in said medium, and is then focused to a light focusing point on a boundary of said medium, and
   wherein part of light reflected from said first reflecting surface is reflected from near a point of intersection of said second reflecting surface and a line passing through said light focusing point and parallel to said predetermined direction.

10. The solid immersion mirror device according to claim 9,
   wherein said light entering said medium is collimated light;
   wherein said first reflecting surface is part of a curved surface produced by rotating a parabola having a symmetry axis extending in said predetermined direction about said symmetry axis; and
   wherein said second reflecting surface is part of a plane which is a perpendicular bisector of a line segment connecting the focus of said parabola and the vertex of said parabola.

11. The solid immersion mirror device according to claim 9,
   wherein said first reflecting surface is part of a conical surface having a rotational axis parallel to said predetermined direction and a vertex pointing toward said lower portion; and
   wherein said second reflecting surface is part of a surface produced by rotating a parabola about a line passing through said focus of said parabola.

12. The solid immersion mirror device according to claim 9,
   wherein each of said first and second reflecting surfaces is part of a curved surface produced by rotating a curved line about an axis extending in said predetermined direction.

13. The solid immersion mirror device according to claim 9,
   wherein a surface of said medium is provided with a mask near said light focusing point, and said mask has a minute opening formed at said light focusing point.

14. The solid immersion mirror device according to claim 13,
   wherein said minute opening has a diameter not greater than a wavelength of said light.

15. A solid immersion mirror device made principally of a light-permeable medium having a refractive index of greater than 1, said solid immersion mirror device comprising:
   a first reflecting surface provided in a lower portion of said medium; and
   a second reflecting surface provided in an upper portion of said medium,
   wherein at least part of light entering said medium in a predetermined direction from said upper portion to said lower portion passes through said second reflecting surface, is thereafter reflected sequentially from said first and second reflecting surfaces while propagating in said medium, and is then focused to a light focusing point on a boundary of said medium.

16. The solid immersion mirror device according to claim 15,
   wherein said light entering said medium is collimated light; and
   wherein said second reflecting surface is an upper surface of said medium and is a flat surface perpendicular to said predetermined direction.

17. The solid immersion mirror device according to claim 16,
   wherein said first reflecting surface is part of a curved surface produced by rotating a parabola having a symmetry axis extending in said predetermined direction about said symmetry axis.

18. The solid immersion mirror device according to claim 16,
   wherein said second reflecting surface is provided with a coating for selectively transmitting light with a small incident angle.

19. The solid immersion mirror device according to claim 15,
   wherein said second reflecting surface is positioned inside said medium.

20. The solid immersion mirror device according to claim 19,
   wherein said first reflecting surface is a flat surface perpendicular to said predetermined direction; and
   wherein said second reflecting surface is part of a curved surface produced by rotating a parabola having a symmetry axis extending in said predetermined direction about said symmetry axis.

21. The solid immersion mirror device according to claim 15, further comprising
   a component between said first and second reflecting surfaces for changing a state of polarization of light passing therethrough,
   wherein said second reflecting surface transmits light polarized in a predetermined polarization direction and reflects light polarized in a direction perpendicular to said predetermined polarization direction; and
   wherein said component for changing said state of polarization converts light incident from said first reflecting surface on said second reflecting surface into light polarized in a direction perpendicular to said predetermined polarization direction.

22. The solid immersion mirror device according to claim 15,
   wherein a surface of said medium is provided with a mask near said light focusing point, and said mask has a minute opening formed at said light focusing point.

23. The solid immersion mirror device according to claim 22,
   wherein said minute opening has a diameter not greater than a wavelength of said light.

24. A reproducing apparatus for reading information recorded on a recording medium, said reproducing apparatus comprising:
   a light source;
   a solid immersion mirror device made principally of a light-permeable medium having a refractive index of greater than 1, said solid immersion mirror device including
  a first reflecting surface which is part of a curved surface produced by rotating part of a parabola lying on the opposite side of a rotational axis from the vertex of said parabola about said rotational axis, said rotational axis being parallel to the symmetry axis of said parabola and intersecting said parabola at a position spaced apart from said vertex of said parabola, and
  a second reflecting surface which is part of a conical surface produced by rotating part of a line lying on the opposite side of said rotational axis from said vertex, said line being perpendicular to a line segment connecting the focus of said parabola and a point of intersection of said parabola and said rotational axis within a plane including said parabola,
  wherein collimated light entering said medium from the second reflecting surface side along said rotational axis is reflected sequentially from said first and second reflecting surfaces while propagating in said medium, and is then focused to a light focusing point on a boundary of said medium;
an optical system for directing light emitted from said light source to said solid immersion mirror device;
a scanning mechanism for scanning said solid immersion mirror device along a recording surface of said recording medium, with said light focusing point of said solid immersion mirror device opposed to said recording surface; and
a detector for detecting light from said recording surface.

25. A reproducing apparatus for reading information recorded on a recording medium, said reproducing apparatus comprising:
a light source;
a solid immersion mirror device made principally of a light-permeable medium having a refractive index of greater than 1,
said solid immersion mirror device including
  a first reflecting surface of a substantially annular shape and provided in a lower portion of said medium, and
  a second reflecting surface provided in an upper portion of said medium,
  wherein light entering said medium in a predetermined direction from said upper portion to said lower portion is reflected sequentially from said first and second reflecting surfaces while propagating in said medium, and is then focused to a light focusing point on a boundary of said medium, and
  wherein part of light reflected from said first reflecting surface is reflected from near a point of intersection of said second reflecting surface and a line passing through said light focusing point and parallel to said predetermined direction;
an optical system for directing light emitted from said light source to said solid immersion mirror device;
a scanning mechanism for scanning said solid immersion mirror device along a recording surface of said recording medium, with said light focusing point of said solid immersion mirror device opposed to said recording surface; and
a detector for detecting light from said recording surface.

26. A reproducing apparatus for reading information recorded on a recording medium, said reproducing apparatus comprising:
a light source;
a solid immersion mirror device made principally of a light-permeable medium having a refractive index of greater than 1,
said solid immersion mirror device including
  a first reflecting surface provided in a lower portion of said medium, and
  a second reflecting surface provided in an upper portion of said medium,
  wherein at least part of light entering said medium in a predetermined direction from said upper portion to said lower portion passes through said second reflecting surface, is thereafter reflected sequentially from said first and second reflecting surfaces while propagating in said medium, and is then focused to a light focusing point on a boundary of said medium;
an optical system for directing light emitted from said light source to said solid immersion mirror device;
a scanning mechanism for scanning said solid immersion mirror device along a recording surface of said recording medium, with said light focusing point of said solid immersion mirror device opposed to said recording surface; and
a detector for detecting light from said recording surface.

27. A solid immersion mirror device comprising a light-permeable medium having a refractive index greater than 1, said solid immersion mirror device comprising:
an upper surface formed in an upper portion of said medium; and
a side reflecting surface of a substantially tubular shape extending from said upper portion to a lower portion of said medium, the side reflecting surface being a part of a curved surface produced by rotating a parabola about a symmetry axis thereof,
wherein collimated light entering said medium along the symmetry axis of the parabola by way of said upper surface in a direction from said upper portion to said lower portion is reflected once from said reflecting surface while propagating in said medium, and is then focused to a focus of the parabola on a boundary of said lower portion, and
wherein said medium has a refractive index of not less than $1/\sin\theta$ wherein $\theta$ is a minimum incident angle on said reflecting surface.

28. The solid immersion mirror device according to claim 27, further comprising a component for intercepting light in a central region of said upper surface.

29. The solid immersion mirror device according to claim 27, further comprising a component for converting light in the form of a light beam of a circular sectional shape into in the form of a light beam of a ring-shaped sectional shape.

30. The solid immersion mirror device according to claim 27, wherein a surface of said medium is provided with a mask near said focus of the parabola, and said mask has a minute opening formed at said focus of the parabola.

31. A reproducing apparatus for reading information recorded on a recording medium, said reproducing apparatus comprising:
a light source;
a solid immersion mirror device comprising a light-permeable medium having a refractive index greater than 1, said solid immersion mirror device including
an upper surface formed in an upper portion of said medium, and
a side reflecting surface of a substantially tubular shape extending from said upper portion to a lower portion of said medium, the side reflecting surface being a part of a curved surface produced by rotating a parabola about a symmetry axis thereof,
wherein collimated light entering said medium along the symmetry axis of the parabola by way of said upper surface in a direction from said upper portion to said lower portion is reflected once from said reflecting surface while propagating in said medium, and is then focused to a focus of the parabola on a boundary of said lower portion, and
wherein said medium has a refractive index of not less than $1/\sin \theta$ wherein $\theta$ is a minimum incident angle on said reflecting surface;
an optical system for directing light emitted from said light source to said solid immersion mirror device;
a scanning mechanism for scanning said solid immersion mirror device along a recording surface of said recording medium, with said light focusing point of said immersion mirror device opposed to said recording surface; and
a detector for detecting light from said recording surface.

32. A solid immersion mirror device made principally of a light-permeable medium having a refractive index of greater than 1, said solid immersion mirror device comprising:
a light incident point positioned on a boundary of an upper portion of said medium; and
a side reflecting surface of a substantially tubular shape extending from said upper portion to a lower portion of said medium,
wherein divergent light entering said medium from said light incident point is reflected once from said side reflecting surface while propagating in said medium, and is then focused to a light focusing point on a boundary of said lower portion.

33. The solid immersion mirror device according to claim 32,
wherein said side reflecting surface is part of a curved surface produced by rotating an ellipse about a major axis thereof; and
wherein said light incident point and said light focusing point are positioned at two foci of said ellipse, respectively.

34. The solid immersion mirror device according to claim 32,
wherein a surface of said medium is provided with a mask near said light focusing point, and said mask has a minute opening formed at said light focusing point.

35. The solid immersion mirror device according to claim 34,
wherein said minute opening has a diameter not greater than a wavelength of said divergent light.

36. A solid immersion mirror device made principally of a light-permeable medium having a refractive index of greater than 1, said solid immersion mirror device comprising:
a light incident point positioned on a boundary of an upper portion of said medium;
a first reflecting surface positioned in a lower portion of said medium and having a downwardly protruding convex shape; and
a second reflecting surface positioned in said upper portion,
wherein divergent light entering said medium from said light incident point is reflected sequentially from said first and second reflecting surfaces while propagating in said medium, and is then focused to a light focusing point on a boundary of said lower portion.

37. The solid immersion mirror device according to claim 36,
wherein said first reflecting surface is a lower part of a curved surface produced by rotating an ellipse about a major axis thereof extending vertically;
wherein the length of said major axis of said ellipse is three times greater than a distance between two foci of said ellipse;
wherein said second reflecting surface is part of a plane perpendicularly intersecting said major axis at a lower one of said two foci of said ellipse; and
wherein said light incident point is positioned at said lower focus of said ellipse, and said light focusing point is positioned at a lower point of intersection of said ellipse and said major axis.

38. The solid immersion mirror device according to claim 36,
wherein a surface of said medium is provided with a mask near said light focusing point, and said mask has a minute opening formed at said light focusing point.

39. The solid immersion mirror device according to claim 38,
wherein said minute opening has a diameter not greater than a wavelength of said divergent light.

40. A solid immersion mirror device made principally of a light-permeable medium having a refractive index of greater than 1, said solid immersion mirror device comprising:
a light incident point positioned on a boundary of said medium;
a first reflecting surface; and
a second reflecting surface,
wherein divergent light entering said medium from said light incident point is reflected from said first reflecting surface to be converted into collimated light while propagating in said medium, and said collimated light is reflected from said second reflecting surface and is then focused to a light focusing point on a boundary of said medium.

41. The solid immersion mirror device according to claim 40,
wherein said first reflecting surface and said second reflecting surface have respective effective areas of the same shape; and
wherein light reflected along a predetermined path of reflection from said first reflecting surface travels in a reverse direction along a path of reflection corresponding to said predetermined path of reflection, and is then reflected from said second reflecting surface.

42. The solid immersion mirror device according to claim 40,
wherein said first reflecting surface and said second reflecting surface have respective effective areas of different shapes.

43. The solid immersion mirror device according to claim 40,
wherein said first reflecting surface is part of a curved surface produced by rotating a first parabola about a symmetry axis thereof and said light incident point is positioned at the focus of said first parabola;

wherein said second reflecting surface is part of a curved surface produced by rotating a second parabola about a symmetry axis thereof, said symmetry axis of said second parabola being coincident with said symmetry axis of said first parabola, and said light focusing point is positioned at the focus of said second parabola; and wherein said collimated light is emitted from said first reflecting surface along said symmetry axis, and is then incident on said second reflecting surface.

44. The solid immersion mirror device according to claim 40, wherein said first reflecting surface has a first reflecting surface element, and an annular second reflecting surface element opposed to said first reflecting surface element;

wherein said second reflecting surface has a third reflecting surface element, and an annular fourth reflecting surface element opposed to said third reflecting surface element;

wherein said light incident point is positioned substantially centrally of said second reflecting surface element, and said light focusing point is positioned substantially centrally of said fourth reflecting surface element; and wherein divergent light entering said medium from said light incident point is reflected sequentially from said first and second reflecting surface elements to be converted into collimated light, and thereafter said collimated light is reflected sequentially from said fourth and third reflecting surface elements and is then focused to said light focusing point.

45. The solid immersion mirror device according to claim 44, wherein each of said first reflecting surface element and said third reflecting surface element is a flat surface; and wherein each of said second reflecting surface element and said fourth reflecting surface element is part of a curved surface produced by rotating a parabola about a symmetry axis thereof.

46. The solid immersion mirror device according to claim 45, wherein said first reflecting surface element and said third reflecting surface element are opposite surfaces of a single plate-like reflecting component.

47. The solid immersion mirror device according to claim 42, wherein said first reflecting surface has a first reflecting surface element, and an annular second reflecting surface element opposed to said first reflecting surface element, and said light incident point is positioned substantially centrally of said second reflecting surface element;

wherein said second reflecting surface is part of a curved surface produced by rotating a parabola about a symmetry axis thereof, and said light focusing point is positioned at the focus of said parabola; and wherein divergent light entering said medium from said light incident point is reflected sequentially from said first and second reflecting surface elements to be converted into collimated light, and thereafter said collimated light is incident on said second reflecting surface along said symmetry axis.

48. The solid immersion mirror device according to claim 40, further comprising an intermediate reflecting surface between said first reflecting surface and said second reflecting surface.

49. The solid immersion mirror device according to claim 40, wherein a surface of said medium is provided with a mask near said light focusing point, and said mask has a minute opening formed at said light focusing point.

50. The solid immersion mirror device according to claim 49, wherein said minute opening has a diameter not greater than a wavelength of said divergent light.

51. A reproducing apparatus for reading information recorded on a recording medium, said reproducing apparatus comprising:

a light source;

a solid immersion mirror device made principally of a light-permeable medium having a refractive index of greater than 1, said solid immersion mirror device including
a light incident point positioned on a boundary of an upper portion of said medium, and
a side reflecting surface of a substantially tubular shape extending from said upper portion to a lower portion of said medium,
wherein divergent light entering said medium from said light incident point is reflected once from said side reflecting surface while propagating in said medium, and is then focused to a light focusing point on a boundary of said lower portion;

an optical system for directing light emitted from said light source to said light incident point of said solid immersion mirror device;

a scanning mechanism for scanning said solid immersion mirror device along a recording surface of said recording medium, with said light focusing point of said solid immersion mirror device opposed to said recording surface; and a detector for detecting light from said recording surface.

52. A reproducing apparatus for reading information recorded on a recording medium, said reproducing apparatus comprising:

a light source;

a solid immersion mirror device made principally of a light-permeable medium having a refractive index of greater than 1, said solid immersion mirror device including
a light incident point positioned on a boundary of an upper portion of said medium,
a first reflecting surface positioned in a lower portion of said medium and having a downwardly protruding convex shape, and
a second reflecting surface positioned in said upper portion,
wherein divergent light entering said medium from said light incident point is reflected sequentially from said first and second reflecting surfaces while propagating in said medium, and is then focused to a light focusing point on a boundary of said lower portion;

an optical system for directing light emitted from said light source to said light incident point of said solid immersion mirror device;

a scanning mechanism for scanning said solid immersion mirror device along a recording surface of said recording medium, with said light focusing point of said solid immersion mirror device opposed to said recording surface; and a detector for detecting light from said recording surface.

53. A reproducing apparatus for reading information recorded on a recording medium, said reproducing apparatus comprising:

a light source;

a solid immersion mirror device made principally of a light-permeable medium having a refractive index of greater than 1, said solid immersion mirror device including
a light incident point positioned on a boundary of said medium,
a first reflecting surface, and
a second reflecting surface,
wherein divergent light entering said medium from said light incident point is reflected from said first reflecting surface to be converted into collimated light while propagating in said medium, and said collimated light is reflected from said second reflecting surface and is then focused to a light focusing point on a boundary of said medium;

an optical system for directing light emitted from said light source to said light incident point of said solid immersion mirror device;

a scanning mechanism for scanning said solid immersion mirror device along a recording surface of said recording medium, with said light focusing point of said solid immersion mirror device opposed to said recording surface; and a detector for detecting light from said recording surface.

54. The solid immersion mirror device according to claim 27, wherein said side reflecting surface has a lower end substantially laterally surrounding said light focusing point.

* * * * *